(12) United States Patent
Thiesson et al.

(10) Patent No.: US 7,596,475 B2
(45) Date of Patent: *Sep. 29, 2009

(54) EFFICIENT GRADIENT COMPUTATION FOR CONDITIONAL GAUSSIAN GRAPHICAL MODELS

(75) Inventors: Bo Thiesson, Woodinville, WA (US); Christopher A. Meek, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 601 days.

This patent is subject to a terminal disclaimer.

(21) Appl. No.: 11/005,148

(22) Filed: Dec. 6, 2004

(65) Prior Publication Data

US 2008/0010043 A1    Jan. 10, 2008

(51) Int. Cl.
*G06F 17/10* (2006.01)
*G06F 15/18* (2006.01)
*G06E 3/00* (2006.01)

(52) U.S. Cl. .................. 703/2; 706/14; 706/21

(58) Field of Classification Search .......... 703/2; 706/14, 21, 25, 41
See application file for complete search history.

(56) References Cited

U.S. PATENT DOCUMENTS

| | | | |
|---|---|---|---|
| 5,544,281 A | 8/1996 | Maruoka et al. |
| 5,809,499 A | 9/1998 | Wong et al. |
| 5,835,682 A | 11/1998 | Broomhead et al. |
| 5,949,678 A | 9/1999 | Wold et al. |
| 6,125,105 A | 9/2000 | Edwads et al. |
| 6,336,108 B1 | 1/2002 | Thiesson et al. |
| 6,345,265 B1 | 2/2002 | Thiesson et al. |
| 6,363,333 B1 | 3/2002 | Deco et al. |
| 6,408,290 B1 | 6/2002 | Thiesson et al. |
| 6,496,816 B1 | 12/2002 | Thiesson et al. |
| 6,529,891 B1 | 3/2003 | Heckerman |
| 6,532,454 B1 | 3/2003 | Werbos |
| 6,560,586 B1 | 5/2003 | Liang et al. |
| 6,574,587 B2 | 6/2003 | Waclawski |
| 6,735,580 B1 | 5/2004 | Li et al. |
| 6,742,003 B2 | 5/2004 | Heckerman et al. |
| 6,778,929 B2 | 8/2004 | Egi |
| 6,807,537 B1 | 10/2004 | Thiesson et al. |
| 6,853,920 B2 | 2/2005 | Hsiung et al. |

(Continued)

OTHER PUBLICATIONS

Matthias Seeger, Bayesian Gaussian Process Models: PAC-Bayesian Generalization Error Bounds and Sparse Approximation, Jul. 2003.*

(Continued)

*Primary Examiner*—Paul L Rodriguez
*Assistant Examiner*—Andre Pierre Louis
(74) *Attorney, Agent, or Firm*—Lee & Hayes, PLLC

(57) ABSTRACT

The subject invention leverages standard probabilistic inference techniques to determine a log-likelihood for a conditional Gaussian graphical model of a data set with at least one continuous variable and with data not observed for at least one of the variables. This provides an efficient means to compute gradients for CG models with continuous variables and incomplete data observations. The subject invention allows gradient-based optimization processes to employ gradients to iteratively adapt parameters of models in order to improve incomplete data log-likelihoods and identify maximum likelihood estimates (MLE) and/or local maxima of the incomplete data log-likelihoods. Conditional Gaussian local gradients along with conditional multinomial local gradients determined by the subject invention can be utilized to facilitate in providing parameter gradients for full conditional Gaussian models.

27 Claims, 10 Drawing Sheets

U.S. PATENT DOCUMENTS

| | | | |
|---|---|---|---|
| 6,882,992 B1* | 4/2005 | Werbos | 706/48 |
| 6,928,398 B1 | 8/2005 | Fang et al. | |
| 6,987,865 B1* | 1/2006 | Szeliski et al. | 382/107 |
| 7,092,457 B1 | 8/2006 | Chugg et al. | |
| 7,139,703 B2* | 11/2006 | Acero et al. | 704/228 |
| 2002/0072882 A1 | 6/2002 | Kruger et al. | |
| 2003/0039867 A1 | 2/2003 | Berger et al. | |
| 2003/0046038 A1 | 3/2003 | Deligne et al. | |
| 2003/0055614 A1 | 3/2003 | Pelikan et al. | |
| 2003/0065409 A1 | 4/2003 | Raeth et al. | |
| 2003/0176931 A1 | 9/2003 | Pednault et al. | |
| 2004/0068199 A1 | 4/2004 | Echauz et al. | |
| 2004/0068332 A1 | 4/2004 | Ben-Gal et al. | |
| 2004/0101048 A1 | 5/2004 | Paris | |
| 2004/0260664 A1 | 12/2004 | Thiesson et al. | |
| 2005/0015217 A1 | 1/2005 | Weidl et al. | |
| 2005/0096873 A1 | 5/2005 | Klein | |
| 2006/0074558 A1* | 4/2006 | Williamson et al. | 701/213 |
| 2006/0247900 A1 | 11/2006 | Brocklebank | |
| 2007/0150077 A1 | 6/2007 | Bocharov et al. | |
| 2008/0010043 A1 | 1/2008 | Thiesson et al. | |

OTHER PUBLICATIONS

U.S. Appl. No. 11/011,864, filed Dec. 14, 2004, Thiesson, et al.

U.S. Appl. No. 10/463,145, filed Jun. 17, 2003, Thiesson, et al.

Andrew W. Moore, et al. "Efficient Locally Weighted Polynomial Regression Predictions" 1997, 9 pages.

Ansley. An algorithm for the exact likelihood of a mixed autoregressive-moving average process, 1979, pp. 59-65, Biometrika, printed in Great Britain.

Aram Karalic, "A Employing Linear Regression in Regression Tree Leaves", European Conference on Artificial Intelligence, 1992, 2 pages.

Bach, et al., Learning Graphical Models For Stationary Time Series, (2004), IEEE Transactions On Signal Processing, to appear.

Berzuini, et al. "A Unified Approach for Modelling Longitudinal and Failure Time Data, with Application in Medical Monitoring." IEEE Trans. On Pattern Analysis and Machine Intelligence. Feb. 1996, vol. 18, issue 2, pp. 109-123.

Bo Thiesson, et al. ARMA Time Series Modeling with Graphical Models. Proceedings of the Twentieth Conference on Uncertainty in Arificial Intelligence, 2004, pp. 552-560. AUAI Press.

Thomas Dean, et al. Probabilistic Temporal Reasoning, Technical Report, May 1988, Brown University, pp. 524-528.

Chickering, et al. "Efficient Determination Of Dynamic Split Points in a Decision Tree." Proc. IEEE Int'l. Conf. on Data Mining. Nov. 29-Dec. 2, 2001. pp. 91-98.

Chickering. A Bayesian Approach to Learning Bayesian Networks with Local Structure@, Aug. 1997, pp. 1-19.

Chipman, et al. A Bayesian Treed Models, Feb. 2001. pp. 1-29.

Coggers. Modern Regression Methods: A Comparative Discussion@, Apr. 19, 2001, pp. 1-11.

Cooper, et al., A Model For Temporal Probabilistic Reasoning (Technical Report KSL-88-30), (1988), Stanford University, Section On Medical Informatics, Stanford, California.

Dempster, et al. Maximum Likelyhood for Incomplete Data Via the EM Algorithm, 1997, Journal of the Royal Statistical Soceity, B39, pp. 1-38.

Gers, et al. "Applying LSTM to Time Series Predictable Through Time-Window Approaches", 2001, 21 pages.

Kapetanios, "A Threshold Models for Trended Time Series", 1999, 32 pages.

Sam-Joo Doh, et al. "Inter-Class MLLR for Speaker Adaptation", Department of Electrical and Computer Engineering and School of Computer Science, Carnegie Mellon University, 2000, 4 pages.

Ghahramani. Learning Dynamic Bayesian Networks. In Adaptive Processing Of Sequences And Data Structures. Lecture Notes in Artificial Intelligence, (1998), p. 168-197, Springer-Verlag, Berlin.

Meek. "Annotated Bibliography of Papers by Christopher Meek." Mar. 2005, printed Dec. 28, 2006. http://research.microsoft.com/~meek/mypapers.htm.

Heckerman, et al. "Casual Independence for Probability Assessment and Interference Using Bayesian Networks." IEEE Transactions on Systems, Man and Cybernetics. Nov. 1996, vol. 26, Issue 6, pp. 826-831.

Heckerman, et al. "Dependency Networks on Inference, Collaboration Filtering and Data Visualization." The Journal of Machine Learning Research. Sep. 2001, vol. 1, pp. 49-75.

Howell Tong. Threshold Models in Non-Linear Time Series Analysis, 1983, 323 pages, Springer-Verlag, New York, NY.

Siohan, et al. "Structural Maximun a Posteriori Linear Regression for Fast HMM Adaptation", Multimedia Communications Research Lab Bell Laboratories—Lucent Technologies, 2000, 8 pages.

Jones. Maximum Likelyhood Fitting of ARMA Models to Time Series with Missing Observations. 1980, Technometrics, pp. 389-395.

Kai Ming Ting, et al. "Theory Combination: an alternative to Data Combination", 1996, 22 pages.

Penzer et al. The Exact Likelihood Of An Autoregressive-Moving Average Model With Incomplete Data, (1997), Biometrika, p. 84, 919-928.

Lewis, et al., Modeling Time Series by Using Multivariate Adaptive Regression Splines (MARS), Time Series Prediction, 1994, pp. 297-318, Addison Wesley, New York, NY.

Lauritzen, et al. Stable Local Computation With Conditional Gaussian Distributions, Statistics and Computing, (2001), pp. 11, 191-203.

Gershenfeld, et al. The Future of Time Series: Learning and Understanding, Time Series Prediction, 1994, pp. 1-70, Addison Wesley, New York, NY.

Meek, et al. Autoregressive Tree Models for Time Series Analysis. Jan. 10, 2002. http://research.microsoft.com/~meek/papers/dmart.ps &pub=63.

Bo Thiesson, Score And Information For Recursive Exponential Models With Incomplete Data. In Geiger, D. and Shenoy, P. P., editors, Proceedings of the Thirteenth Conference on Uncertainty in Artificial Intelligence, (1997), pp. 453-463. Morgan Kaufmann Publishers.

John Binder, et al,. Adaptive probabilistic networks with hidden variables; Machine Learning, (1997) 29, 213-244.

Bo Thiesson, et al., Efficient Gradient Computation For Conditional Gaussian Models, (2004) 8 pages, unpublished.

* cited by examiner

EFFICIENT GRADIENT COMPUTATION FOR CONDITIONAL GAUSSIAN GRAPHICAL MODELS

RELATED APPLICATIONS

This application is related to co-pending and co-assigned U.S. applications entitled "SYSTEMS AND METHODS FOR NEW TIME SERIES MODEL PROBABILISTIC ARMA," filed on Jun. 17, 2003 and assigned Ser. No. 10/463,145 and "GRADIENT LEARNING FOR PROBABILISTIC ARMA TIME-SERIES MODELS," filed on Dec. 14, 2004 and assigned Ser. No. 11/011,864. The above-noted applications are incorporated herein by reference.

TECHNICAL FIELD

The present invention relates generally to data analysis, and more particularly to systems and methods for determining gradients of conditional Gaussian graphical models.

BACKGROUND OF THE INVENTION

A Bayesian network is one type of a graphical statistical model that encodes probabilistic relationships among variables of interest. Over the last decade, the Bayesian network has become a popular representation for encoding uncertain expert knowledge in expert systems. When used in conjunction with statistical techniques, the graphical model has several advantages for data analysis. Because the model encodes dependencies among all variables, it readily handles situations where some data entries are missing. A graphical model, such as a Bayesian network, can be used to learn causal relationships, and hence can be used to gain understanding about a problem domain and to predict the consequences of intervention. Because the model has both a causal and probabilistic semantics, it is an ideal representation for combining prior knowledge (which often comes in causal form) and data. Additionally, Bayesian statistical methods in conjunction with Bayesian networks offer an efficient and principled approach for avoiding the over fitting of data.

Graphical statistical models facilitate probability theory through the utilization of graph theory. This allows for a method of dealing with uncertainty while reducing complexity. The modularity of a graphical model permits representation of complex systems by utilizing less complex elements. The connections and relationships of individual elements are identified by the probability theory, while the elements themselves are constructed by the graph theory. Utilizing graphics also provides a much more intuitive human interface to difficult problems.

Nodes of a probabilistic graphical model represent random variables. Their connectivity can indicate associative qualities such as dependence and independence and the like. If no connectivity (i.e., "arcs") is present, this represents conditional independence assumptions, providing a representation of joint probability distributions. Graphical models can be "directed" or "undirected" depending on how they are constructed. Undirected graphical models have a more simplistic definition of independence, while directed graphical models are more complex by nature. Bayesian or "Belief" networks (BN) are included in the directed category and are utilized extensively in statistics and artificial intelligence to show causality between elements or "nodes." They are also highly beneficial in supplying "inferences." That is, they are able to infer information based on a posterior probability (i.e., "likelihood") utilizing Bayes' rule. Therefore, for a given outcome, its cause can be probabilistically deduced utilizing a directed graphical model.

An often used type of Bayesian network is known as a conditional Gaussian (CG) network and is a graphical model that encodes a conditional Gaussian distribution for variables of a domain. A CG model is a directed graphical model with both discrete and continuous variables. For a directed graphical model, the structural relations between variables $X = (X_1, \ldots, X_m)$ are represented by a directed acyclic graph (DAG), where each node represents a variable $X_v$, and directed edges represent direct influence from variables represented by parent variables $X_{pa(v)}$. A CG model is characterized by: (i) the graphical DAG structure has no discrete variable with a continuous parent variable, (ii) the joint model can be represented by local conditional models $p(X_v|X_{pa(v)})$, (iii) the local models for discrete variables (given discrete parents) are defined by conditional multinomial distributions—one for each configuration of possible values for the discrete parents, and (iv) the local models for continuous variables (given continuous and discrete parents) are defined by conditional Gaussian regressions—one for each configuration of possible values for discrete parents. Because of the usefulness of this type of model, being able to efficiently facilitate in determining parameters for constructing a conditional Gaussian graphical model is highly desirable.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The subject invention relates generally to data analysis, and more particularly to systems and methods for determining gradients of conditional Gaussian graphical models. Standard probabilistic inference techniques are leveraged to determine a log-likelihood for a conditional Gaussian graphical model of a data set with at least one continuous variable and with data not observed for at least one of the variables. This provides an efficient means to compute gradients for CG models with continuous variables and incomplete data observations. The subject invention allows gradient-based optimization processes to employ gradients to iteratively adapt parameters of models in order to improve incomplete data log-likelihoods and identify maximum likelihood estimates (MLE) and/or local maxima of the incomplete data log-likelihoods. Conditional Gaussian local gradients along with conditional multinomial local gradients determined for the local models in a full conditional Gaussian model by the subject invention can be utilized to facilitate in providing parameter gradients for full conditional Gaussian models. Thus, the present invention significantly enhances the efficiency and ability of gradient-based processes to provide parameters for CG models. It is applicable to conditional Gaussian models with tied and/or fixed local parameters as well.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents.

Other advantages and novel features of the invention may become apparent from the following detailed description of the invention when considered in conjunction with the drawings.

DETAILED DESCRIPTION OF THE INVENTION

Figure 1:
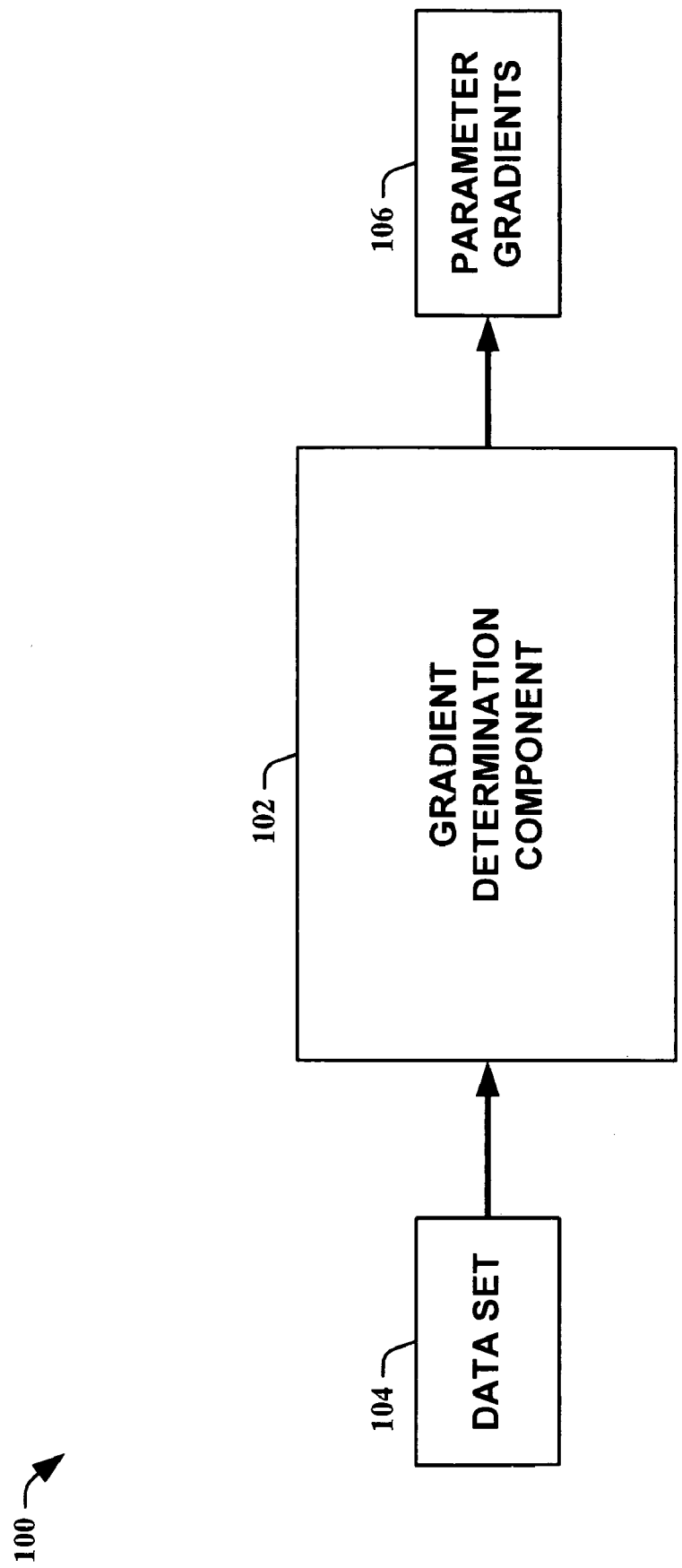
FIG. 1 is a block diagram of a gradient determination system in accordance with an aspect of the subject invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a computer component. One or more components may reside within a process and/or thread of execution and a component may be localized on one computer and/or distributed between two or more computers. A "thread" is the entity within a process that the operating system kernel schedules for execution. As is well known in the art, each thread has an associated "context" which is the volatile data associated with the execution of the thread. A thread's context includes the contents of system registers and the virtual address belonging to the thread's process. Thus, the actual data comprising a thread's context varies as it executes.

The computation of parameter gradients given incomplete data is an important step in learning the parameters of a statistical model with missing data. In particular, for a gradient based optimization methods such as, for example, a conjugate gradient method, the gradient is utilized to iteratively adapt the parameters of the model in order to improve the incomplete-data log-likelihood and, in this way, identify the maximum likelihood estimate or local maxima of the incomplete-data log-likelihood. The subject invention provides a way to efficiently compute parameter gradients for the well-known class of conditional Gaussian (CG) graphical models (also known as Bayes nets with both discrete and continuous variables). The subject invention, in part, utilizes a standard probabilistic inference technique to efficiently compute the parameter gradients. Prior work related to the computation of gradients for graphical models highlighted the fact that the computation of gradients was accomplished via probabilistic inference. However, this work was restricted to graphical models with discrete variables only. The subject invention, on the other hand, employs probabilistic inference to determine the gradient for CG graphical models which also contain continuous variables.

Figure 2:
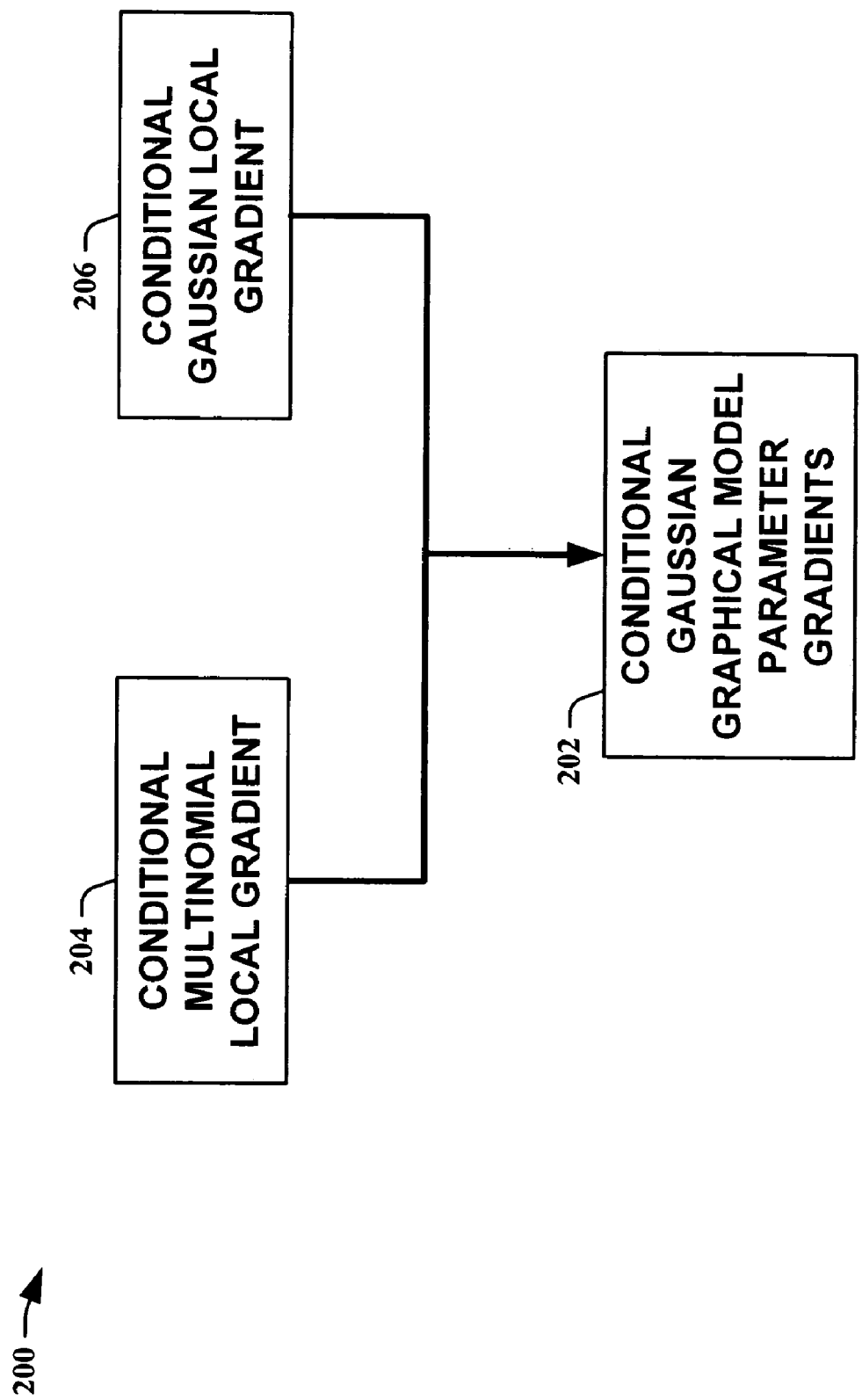
FIG. 2 is an illustration of the composition of parameter gradients for a conditional Gaussian graphical model in accordance with an aspect of the subject invention.

In FIG. 1, a block diagram of a gradient determination system 100 in accordance with an aspect of the subject invention is shown. The gradient determination system 100 is comprised of a gradient determination component 102 that receives a data set 104 and outputs parameter gradients 106. The data set 104 includes data about a variable set that includes continuous variables. The data set 104 contains incomplete observation data about the variable set. The gradient determination component 102 employs probabilistic inference techniques to determine the parameter gradients 106 despite incompleteness of data in the data set 104. This is accomplished in an extremely efficient manner and substantially facilitates gradient optimization processes to quickly iterate and obtain optimized parameters. As shown in the illustration 200 of FIG. 2, the gradient determination component 102 can determine a conditional multinomial local gradient 204 for a conditional multinomial local model and/or a conditional Gaussian local gradient 206 for a conditional Gaussian local model. Thus, both types of gradients 204, 206 are determined to fully define conditional Gaussian graphical model parameter gradients 202 for a conditional Gaussian model.

Figure 3:
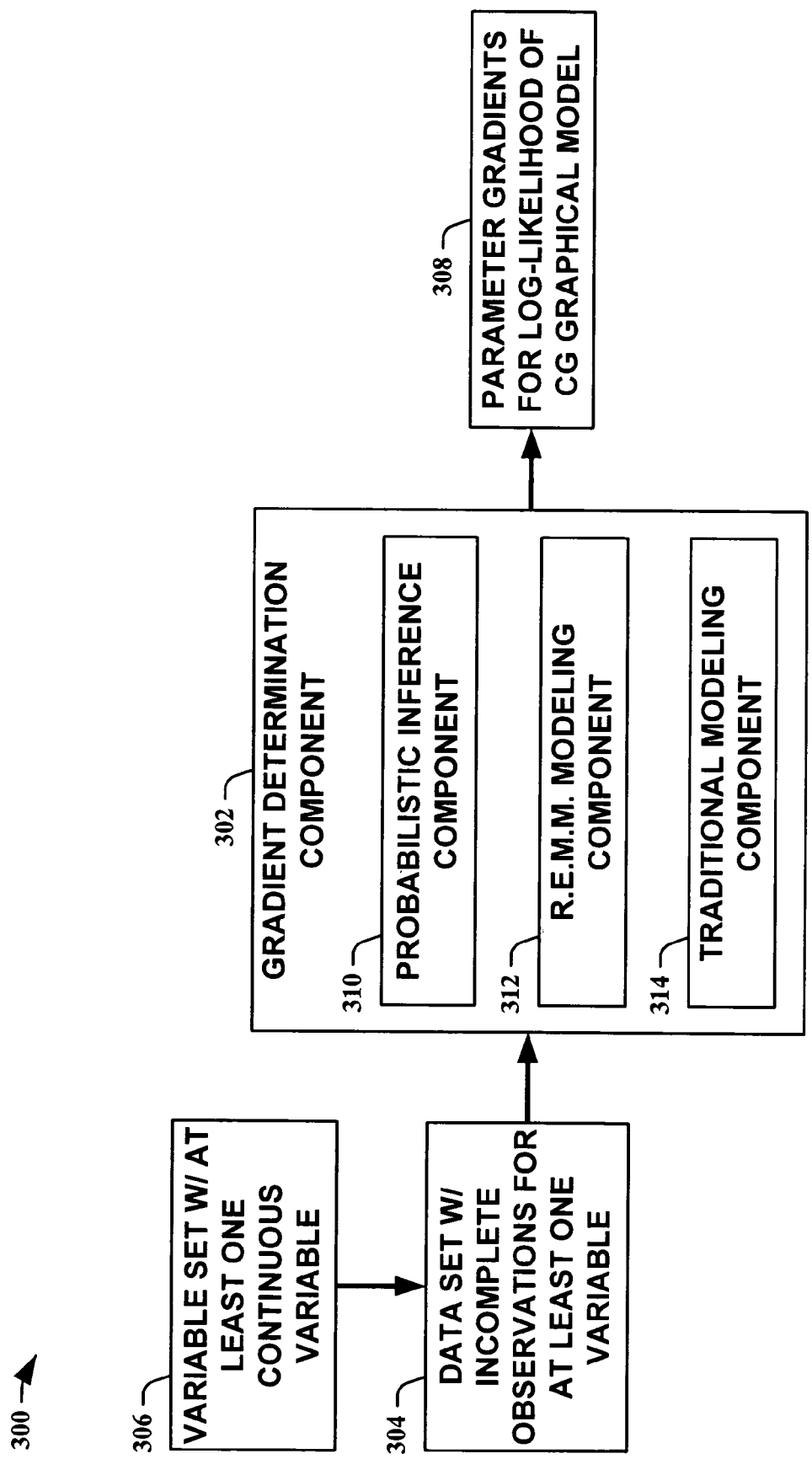
FIG. 3 is another block diagram of a gradient determination system in accordance with an aspect of the subject invention.

Referring to FIG. 3, another block diagram of a gradient determination system 300 in accordance with an aspect of the subject invention is illustrated. The gradient determination system 300 is comprised of a gradient determination component 302 that receives a data set with incomplete observations for at least one variable 304 based on a variable set with at least one continuous variable 306 and outputs parameter gradients for a log-likelihood of a conditional Gaussian graphical model 308. The gradient determination component 302 is comprised of a probabilistic inference component 310, a recursive exponential mixed model (REMM) modeling component 312, and a traditional modeling component 314. The REMM modeling component 312 creates an exponential family based model for mixed (continuous and discrete) variable sets. The gradient determination component 302 creates exponential family models for facilitating the determination of conditional multinomial local gradients and/or conditional Gaussian local gradients. The traditional modeling component 314 creates a more traditional representation of the parameters in the model. This more traditional representation facilitates the probabilistic inference component 310, which again facilitates computation of statistics used in the gradient computations using the exponential family model representation. Thus, the gradient determination component 302 utilizes the modeling components 312, 314 as required along with the probabilistic inference component 310 to determine gradients for conditional multinomial local models and/or conditional Gaussian local models. In this manner, the parameter gradients for a log-likelihood of a conditional Graphical model 308 can be ascertained. Details of processes to obtain gradient parameters and interaction of the component processes are described infra.

Techniques to derive parameter gradients for a broad class of graphical models called recursive exponential mixed models (REMMs) are now described. REMMs generalize the well-known conditional Gaussian (CG) directed graphical models introduced in Lauritzen, S. L., & Wermuth, N.; Graphical Models for Associations Between Variables, Some of Which Are Qualitative and Some Quantitative; *The Annals of Statistics,* 17, 31-57; 1989. While REMMs have modeling advantages over CG models (e.g., allowing discrete variables to have continuous parents), they are utilized in the subject invention as a tool to derive the parameter gradient for CG models.

CG models are an important class of graphical models. They generalize discrete and Gaussian Bayesian networks and, more importantly, they have efficient exact probabilistic inference algorithms for computing conditional marginal probabilities (Lauritzen, S. L., & Jensen, F.; Stable Local Computation with Conditional Gaussian Distributions; *Statistics and Computing,* 11, 191-203; 2001). The expression for the parameter gradient in CG models is derived and demonstrated to show that standard probabilistic inference techniques can be utilized to efficiently compute these gradients.

The subject invention can also yield simple and effective techniques for determining parameter gradients of graphical models with tied parameters and/or fixed parameters. For example, the subject invention can be utilized to handle tied parameters on stochastic ARMA models (Thiesson, B., Chickering, D. M., Heckerman, D., and Meek, C.; ARMA Time-Series Modeling with Graphical Models; *Proceedings of the Twentieth Conference on Uncertainty in Artificial Intelligence* (pp. 552-560); AUAI Press; 2004). The stochastic ARMA model is a simple and useful model for modeling time-series data.

Previous work has been accomplished for deriving parameter gradients for graphical models. For example, (Thiesson, B.; Score and Information for Recursive Exponential Models with Incomplete Data; *Proceedings of the Thirteenth Conference on Uncertainty in Artificial Intelligence* (pp. 453-463); Morgan Kaufmann Publishers; 1997) and (Binder, J., Koller, D., Russell, S. J., and Kanazawa, K.; Adaptive Probabilistic Networks with Hidden Variables; *Machine Learning,* 29, 213-244; 1997) derive the parameter gradient for general classes of graphical models. In addition, both Thiesson (1997) and Binder et al. (1997) demonstrate that, for graphical models with only discrete variables, one can compute the parameter gradient using exact probabilistic inference. Binder et al. (1997) also discuss computation of the parameter gradient for models that have continuous variables. For such models, they resort to stochastic simulation to compute the gradient; they do so even with conditional Gaussian models for which exact probabilistic inference algorithms exist. The subject invention supersedes this work by demonstrating the utilization of probabilistic inference to determine the gradient for CG graphical models.

Recursive Exponential Mixed Models

Figure 4:
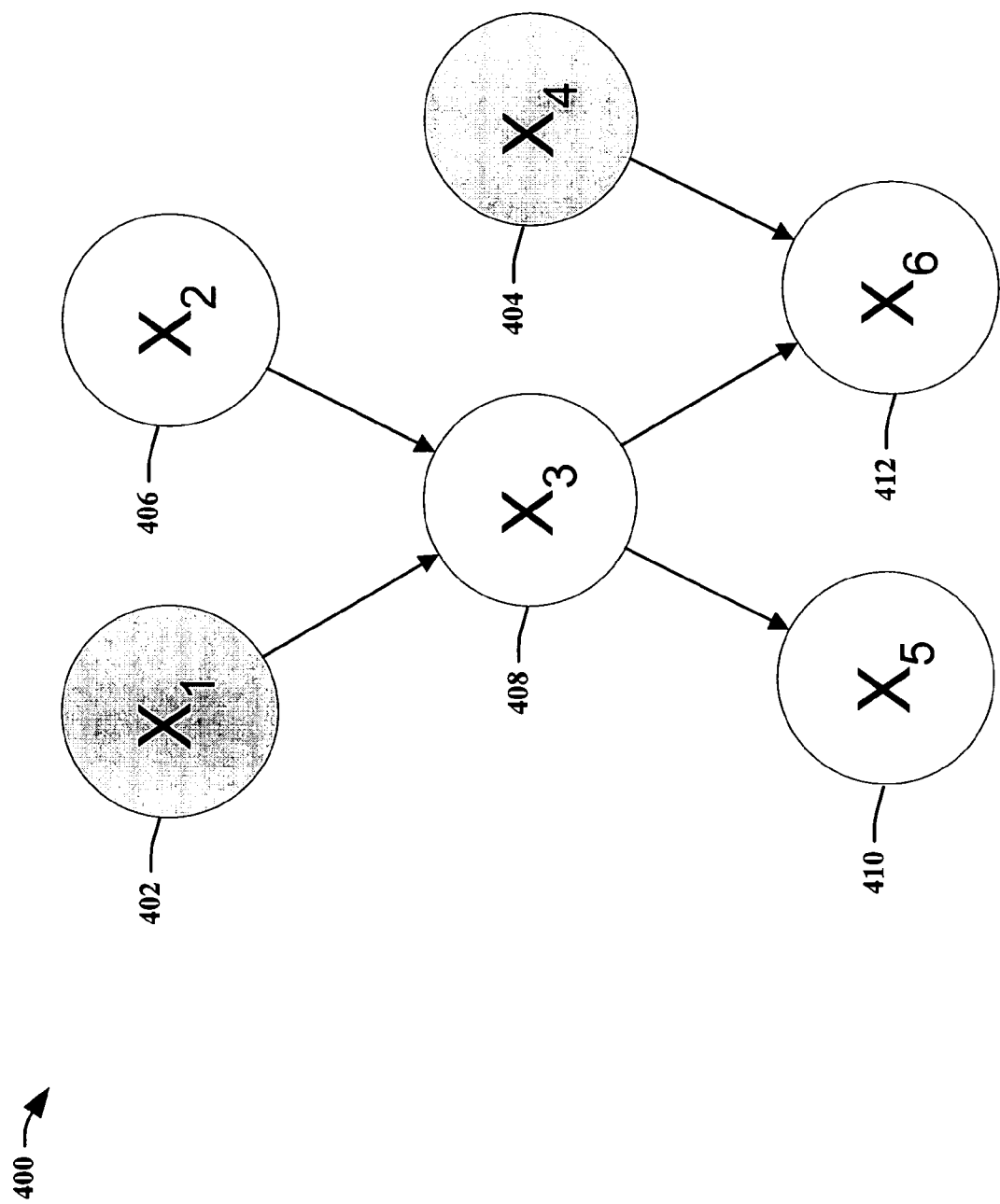
FIG. 4 is an illustration of a conditional Gaussian graphical model in accordance with an aspect of the subject invention.

Directed graphical models with both discrete and continuous variables are considered. For a directed graphical model, the structural relations between variables $X=(X_v)_{v \in V}$ are represented by a directed acyclic graph (DAG), where each node v represents a variable, $X_v$, and directed edges represent direct influence from variables represented by parent nodes, $X_{pa(v)}$. Markov properties with respect to the graph ((Kiiveri, H., Speed, T. P., & Carlin, J. B.; Recursive Causal Models; *Journal of the Australian Mathematical Society,* 36, 30-52; 1984); (Lauritzen, S. L., Dawid, A. P., Larsen, B. N., and Leimer, H.-G.; Independence Properties of Directed Markov Fields; *Networks,* 20, 491-505; 1990)) imply that any distribution, which is structurally defined by such a model, can be represented by (local) conditional distributions, $p(X_v|X_{pa(v)})$. In FIG. 4, an illustration of a conditional Gaussian graphical model 400 in accordance with an aspect of the subject invention is shown. Nodes $X_1$ 402 and $X_2$ 406 are parents of node $X_3$ 408, node $X_3$ 408 is a parent node of nodes $X_5$ 410 and $X_6$ 412, and node $X_4$ 404 is a parent node of node $X_6$ 412. Nodes $X_2$ 406, $X_3$ 408, $X_5$ 410, and $X_6$ 412 are continuous nodes while nodes $X_1$ 402 and $X_4$ 404 are discrete nodes. No discrete node has a continuous parent.

Thiesson (1997) defines a class of directed graphical models called recursive exponential models (REMs) which focuses on models with discrete variables only. The subject invention extends this definition to mixed models with both continuous and discrete variables. This class of models is called recursive exponential mixed models (REMMs).

Both REM and REMM models assume global variation independence for the parameters in the models. That is, $$p(X \mid \theta) = \prod_{v \in V} p(X_v \mid X_{pa(v)}, \theta_v), \qquad (Eq.\ 1)$$

where $\Theta = \times_{v \in V} \Theta_v$ and $\theta_v \in \Theta_v$ completely specifies the relationship between the variable $X_v$ and its conditional set of parent variables $X_{pa(v)}$.

For mixed models, the conditioning set for distributions on the right-hand side of (Eq. 1) can have both continuous variables, denoted $X_{pa(v)}{}^c$, and discrete variables, denoted $X_{pa(v)}{}^d$. That is, $X_{pa(v)} = (X_{pa(v)}{}^c, X_{pa(v)}{}^d)$. When the conditioning set contains discrete variables, REMM models will, in addition, assume partial local variation independence between parameters in conditional distributions with different values for the discrete conditioning variables. Let $\Pi_v^d$ denote the set of all configurations for discrete parents of v and let $\pi_v^d \in \Pi_v^d$ denote a particular configuration. By partial local parameter independence, $\Theta_v = \times_{\pi_v^d \in \Pi_v^d} \Theta_{v \mid \pi_v^d}$ and $\theta_{v \mid \pi_v^d} \in \Theta_{v \mid \pi_v^d}$ completely define the local model $p(X_v \mid X_{pa(v)}{}^c, \pi_v^d, \theta_{v \mid \pi_v^d})$. Notice that if the discrete set of parent variables is empty, then the local model becomes $p(X_v \mid X_{pa(v)}{}^c, \pi_v^d, \theta_{v \mid \pi_v^d}) = p(X_v \mid X_{pa(v)}, \theta_v)$. Hence, REMM models with only continuous variables will only require global parameter independence. Notice also that if all involved variables are discrete, then partial local parameter independence is the same as local parameter independence, as defined for the REM models.

Given global and partial local parameter independence, the likelihood for a single observation factors into local likelihoods as follows:

$$p(x \mid \theta) = \prod_{v \in V} p(x_v \mid x_{pa(v)}, \theta_{v \mid \pi_v^d}).$$

For a REMM, the local models have to be representable as regular exponential models. Hence, a local likelihood is represented as:

$$p(x_v \mid x_{pa(v)}, \theta_{v \mid \pi_v^d}) = b(x_v)\exp(\theta_{v \mid \pi_v^d} t(x_v)' - \phi(\theta_{v \mid \pi_v^d})), \quad \text{(Eq. 2)}$$

where b is the carrying density, t the canonical statistics, φ the normalization function, and ' denotes transpose. Notice that b, t, φ are specific to the distribution and are conditioned on the discrete parents $x_{pa(v)}{}^d = \pi_v{}^d$.

As described supra, a model is a REMM if it is defined in terms of local models represented as regular exponential models, and the collection of local models satisfy global and partial local variation independence. The assumptions of variation independence can be easily relaxed to allow parameters to be tied across local models and is discussed in detail infra.

Conditional Gaussian Models

The REMMs are particularly designed to generalize the class of conditional Gaussian (CG) models introduced by Lauritzen and Wermuth (1989). The CG models are of particular interest because the exact inference scheme of Lauritzen and Jensen (2001) can be utilized to efficiently compute the parameter gradients for these models.

As stated previously, a conditional Gaussian directed graphical model is a graphical model in which (i) the graphical DAG structure has no discrete variable with a continuous parent variable, (ii) the local models for discrete variables are defined by conditional multinomial distributions that can be represented in the usual way via conditional probability tables, and (iii) the local models for continuous variables (given continuous and discrete parents) are defined by conditional Gaussian regressions—one for each configuration of values for discrete parents. In particular:

$$p(X_v \mid X_{pa(v)}^c, \pi_v^d, \theta_{v \mid \pi_v^d}) \sim N(c(\pi_v^d) + \beta(\pi_v^d) X_{pa(v)}^c, \sigma(\pi_v^d)).$$

It is emphasized here that the intercept for the regression, c, the linear regression coefficients, β, and the variance σ all depend on the particular configuration for the discrete parents, $\pi_v^d$. To simplify the notation in what follows, this explicit dependence is dropped.

Local conditional multinomial and non-degenerate (or positive) local conditional Gaussian distributions can be represented as exponential models as illustrated infra. A CG model assuming global and partial local parameter independence is therefore a REMM.

Incomplete-Data Gradient

Samples of incomplete observation are considered, and it is assumed that the observations are incomplete in a non-informative way (e.g., missing at random; Gelman, A., Carlin, J. B., Stern, H. S., and Rubin, D. B.; *Bayesian Data Analysis*; London: Chapman and Hall; 1995). Let $y=(y^1, y^2, \ldots, y^L)$ denote a sample of possibly incomplete observations which are mutually independent. Given the mutual independence, the likelihood factorizes as a product over likelihoods for each observation:

$$p(y \mid \theta) = \prod_{l=1}^{L} p(y^l \mid \theta).$$

The gradient for the sample log-likelihood can therefore be obtained by simply adding the individual gradients for each observation. That is, $$\frac{\partial \log p(y \mid \theta)}{\partial \theta_{v \mid \pi_v^d}} = \sum_{l=1}^{L} \frac{\partial \log p(y^l \mid \theta)}{\partial \theta_{v \mid \pi_v^d}}. \quad \text{(Eq. 3)}$$

The gradient expression for a single observation is derived infra, knowing that the gradient for a sample can be obtained by simply adding up gradients for each observation, as in (Eq. 3).

Single Observation Gradient

Suppose for a given model that a complete observation x is only observed indirectly through the incomplete observation y. Denote by X(y) the set of possible completions that are obtainable by augmenting the incomplete observation y. The likelihood for the incomplete observation then becomes:

$$p(y \mid \theta) = \int_{x \in X(y)} p(x \mid \theta) \mu(x) \quad \text{(Eq. 4)}$$

$$= \int_{x \in X(y)} \prod_{v \in V} p(x_v \mid x_{pa(v)}, \theta_{v \mid \pi_v^d}) \mu(x),$$

where μ is a generalized measure, which for a CG model is an appropriate combination of the counting measure for discrete variables and the Lebesque measure for continuous variables.

The gradient for the log-likelihood can now be expressed as:

$$\frac{\partial \log p(y \mid \theta)}{\partial \theta_{v \mid \pi_v^d}} = \frac{1}{p(y \mid \theta)} \frac{\partial p(y \mid \theta)}{\partial \theta_{v \mid \pi_v^d}} \quad \text{(Eq. 5)}$$

$$= \frac{1}{p(y \mid \theta)} \int_{x \in X(y)} \frac{\partial p(x \mid \theta)}{\partial \theta_{v \mid \pi_v^d}} \mu(x),$$

where the last equality follows from (Eq. 4) and by using Leibnitz's rule for interchanging the order of differentiation and integration.

Now, consider the local gradient for the complete observation x. The chain rule for differentiation implies:

$$\frac{\partial p(x \mid \theta)}{\partial \theta_{v \mid \pi_v^d}} = \frac{p(x \mid \theta)}{p(x_v \mid x_{pa(v)}, \theta_{v \mid \pi_v^d})} \frac{\partial p(x_v \mid x_{pa(v)}, \theta_{v \mid \pi_v^d})}{\partial \theta_{v \mid \pi_v^d}} \quad \text{(Eq. 6)}$$

$$= p(x \mid \theta) \frac{\partial \log p(x_v \mid x_{pa(v)}, \theta_{v \mid \pi_v^d})}{\partial \theta_{v \mid \pi_v^d}}.$$

Thus, by the exponential representation in (Eq. 2), the local gradient for a complete observation becomes:

$$\frac{\partial p(x \mid \theta)}{\partial \theta_{v \mid \pi_v^d}} = p(x \mid \theta) I^{\pi_v^d}(x_{pa(v)}^d)(t(x_v) - \tau(\theta_{v \mid \pi_v^d})), \quad \text{(Eq. 7)}$$

where

-continued $$\tau(\theta_{v|\pi_v^d}) = \frac{\partial \phi(\theta_{v|\pi_v^d})}{\partial \theta_{v|\pi_v^d}};$$

and $I^{\pi_v^d}(x_{pa(v)}^d)$ is the indicator function, which is one for $x_{pa(v)}^d = \pi_v^d$ and zero otherwise.

It is a well-known fact from exponential model theory that the derivative for the normalizing function equals the expected value of the canonical statistics (see, e.g., Schervish, M. J.; *Theory of statistics;* New York: Springer-Verlag; 1995). That is:

$$.\tau(\theta_{v|\pi_v^d}) = E_{\theta_{v|\pi_v^d}}[t(X_v)].$$

This fact is utilized infra when deriving the gradient for specific distributions.

Now, by inserting (Eq. 7) into (Eq. 5), the following expression is obtained for the local gradient of the incomplete observation:

$$\frac{\partial \log p(y|\theta)}{\partial \theta_{v|\pi_v^d}} = \int_{x \in X(y)} \frac{p(x|\theta)}{p(y|\theta)} I^{\pi_v^d}(x_{pa(v)}^d) \times (t(x_v) - \tau(\theta_{v|\pi_v^d})) \mu(x).$$

Finally, by applying the fact that:

$$p(x|y,\theta) = \begin{cases} \frac{p(x|\theta)}{p(y|\theta)} & \text{for } x \in X(y) \text{ and } p(y|\theta) > 0 \\ 0 & \text{otherwise.} \end{cases};$$

the final expression is then obtained for the local gradient:

$$\frac{\partial \log p(y|\theta)}{\partial \theta_{v|\pi_v^d}} = \int p(x_{v \cup pa(v)} | y, \theta) I^{\pi_v^d}(x_{pa(v)}^d) \times \qquad (\text{Eq. 8})$$
$$(t(x_v) - \tau(\theta_{v|\pi_v^d})) \mu(x_{v \cup pa(v)})$$
$$= \int p(x_v, x_{pa(v)}^c, \pi_v^d | y, \theta) \times$$
$$(t(x_v) - \tau(\theta_{v|\pi_v^d})) \mu(x_v, x_{pa(v)}^c);$$

where the last equation follows from integrating over all discrete parents and exploiting the fact that $I^{\pi_v^d}(x_{pa(v)}^d)$ is one for $x_{pa(v)}^d = \pi_v^d$ and zero otherwise.

The incomplete-data log-likelihood gradient expression in (Eq. 8) applies for any local exponential model. Although this generality makes the expression appear somewhat complicated, the exponential model expression leads to simple expressions for the more specific local conditional multinomials and conditional Gaussians in the CG models.

Re-Parameterization

The local gradient for a regular exponential model distribution is a step on the way in deriving the local gradients for the specific local distributions in CG models. For these specific distributions, specific more traditional (non-exponential) parameterizations are considered as illustrated infra. To obtain the gradient with respect to a new parameterization $\psi$, the chain rule is applied and the derivative in (Eq. 7) is multiplied by the Jacobian $\partial \theta_{v|\pi_v^d}/\partial \psi$. Doing so obtains:

$$\frac{\partial p(x|\psi)}{\partial \psi} = \frac{\partial p(x|\theta)}{\partial \theta_{v|\pi_v^d}} \frac{\partial \theta_{v|\pi_v^d}}{\partial \psi}$$
$$= p(x|\theta) I^{\pi_v^d}(x_{pa(v)}^d) \times (t(x_v) - \tau(\theta_{v|\pi_v^d})) \frac{\partial \theta_{v|\pi_v^d}}{\partial \psi}.$$

Performing the same operations that lead from (Eq. 7) to (Eq. 8) is trivial, and the expression for the local gradient of the incomplete-data log-likelihood with respect to the re-parameterization is finally obtained:

$$\frac{\partial \log p(y|\psi)}{\partial \psi} = \qquad (\text{Eq. 9})$$
$$\int p(x_v, x_{pa(v)}^c, \pi_v^d | y, \theta) \times (t(x_v) - \tau(\theta_{v|\pi_v^d})) \frac{\partial \theta_{v|\pi_v^d}}{\partial \psi} \mu(x_v, x_{pa(v)}^c).$$

Conditional Multinomial Local Gradient

Now consider the local gradient for the two specific types of local distributions in a CG model. First consider a conditional multinomial distribution for $p(X_v|\pi_v^d)$. As demonstrated in Thiesson (1997), an exponential model representation for this distribution can be obtained as follows. Let $s_0$ denote a value of reference for the discrete variable $X_v$ and let $s_+ = 1, \ldots, S$ be the remaining possible values for $X_v$. If $s_0$ is chosen as any value for which $p(s_0|\pi_v^d) > 0$, the conditional multinomial distribution can be represented by an exponential model with probabilities of the form (Eq. 2) by letting:

$$\theta^{s_+} = \log[p(s_+|\pi_v^d)/p(s_0|\pi_v^d)]$$

$$t^{s_+}(x_v) = \begin{cases} 1 & \text{for } x_v = s_+ \\ 0 & \text{otherwise} \end{cases}$$

$$\phi(\theta_{v|\pi_v^d}) = \log\left(1 + \sum_{s_+=1}^{S} \exp(\theta^{s_+})\right)$$

$$b(x_v) = 1$$

where $\theta_{v|\pi_v^d} = (\theta^1, \ldots, \theta^S)$ and $t(x_v) = (t^1(x_v), \ldots, t^S(x_v))$.

The expected value for the canonical statistics in the above exponential model representation is:

$$\tau(\theta_{v|\pi_v^d}) = E_{\theta_{v|\pi_v^d}}[t(X_v)]$$
$$= \sum_{x_v} t(x_v) p(x_v | x_{pa(v)}, \theta_{v|\pi_v^d})$$
$$= (p^1, \ldots, p^S)$$

where $p^{s_+} = p(X_v = s_+ | \pi_v^d, \theta_{v|\pi_v^d})$.

The expression for the local gradient with respect to the exponential model parameterization is finally obtained by inserting the above expressions for $t(x_v)$ and $\tau(\theta_{v|\pi_v^d})$ into equation (Eq. 8). The elements of this vector are:

$$\frac{\partial \log p(y \mid \theta)}{\partial \theta^{s+}} = \int p(x_v, \pi_v^d \mid y, \theta) t^{s+}(x_v) \mu(x_v) - \int p(x_v, \pi_v^d \mid y, \theta) p^{s+} \mu(x_v)$$

$$= p(s_+, \pi_v^d \mid y, \theta_{v \mid \pi_v^d}) - p(\pi_v^d \mid y, \theta_{v \mid \pi_v^d}) p(s_+ \mid \pi_v^d, \theta_{v \mid \pi_v^d}).$$

(Eq. 10)

The Lauritzen and Jensen (2001) propagation scheme for Bayesian networks with CG distributions can now be utilized to efficiently compute the quantities in (Eq. 10). The propagation scheme enables the posterior marginal distributions to be efficiently computed for any family $X_{v \cup pa(v)}$ given evidence y. This marginal distribution is represented as the product of a marginal distribution for discrete variables and a conditional Gaussian for continuous variables given the discrete variables. The posterior probabilities $p(s_+, \pi_v^d | y, \theta_{v | \pi_v^d})$ and $p(\pi_v^d | y, \theta_{v | \pi_v^d})$ can therefore easily be extracted from the discrete marginal distribution and, hence, a conditional multinomial local gradient can be efficiently computed.

The Lauritzen and Jensen (2001) propagation scheme utilizes the traditional parameterization for the conditional multinomial distribution. This representation is given by the conditional probabilities $(p^0, \ldots, p^S)$, where $p^0 = p(X_v = s_0 | \pi_v^d, \theta_{v | \pi_v^d})$ and $p^{s+}$ is defined as above. Hence, after the parameters for the exponential model representation are updated during the line-search in a gradient based optimization method, they are switched back into this more traditional representation—utilizing (Eq. 2)—in order to utilize the propagation scheme to compute the next gradient.

Switching between representations has a minor computational cost. On the other hand, performing the gradient optimization for parameters in the exponential model representation has the benefit that this parameterization automatically enforces the constraints $p^s \geq 0$ and $\Sigma_s p^s = 1$, which is not the case for gradient optimization utilizing the traditional parameters.

Next, the alternative gradient for the traditional parameter representation is considered. In order to derive this gradient, the Jacobian is first derived from the exponential model representation to the traditional probability parameterization:

$$\frac{\partial \theta_{v \mid \pi_v^d}}{\partial (p^0, \ldots, p^S)} = \begin{bmatrix} -1/p^0 & 1/p^0 & 0 & \ldots & 0 \\ & & & \vdots & \\ -1/p^0 & 0 & \ldots & 0 & 1/p^S \end{bmatrix}.$$

By insertion into equation (Eq. 9), the local gradient with respect to the traditional representation is obtained. The $s^{th}$ ($s=0, \ldots, S$) element in this gradient is given by:

$$\frac{\partial \log p(y \mid \theta)}{\partial p^s} = \frac{p(s, \pi_v^d \mid y, \theta)}{p(s \mid \pi_v^d, \theta_{v \mid \pi_v^d})} - p(\pi_v^d \mid y, \theta).$$

(Eq. 11)

Notice that the expression for this gradient differs slightly from the gradient expression in Binder et al. (1997) [Equation (4)].

Binder et al. (1997) describe a well-known method to ensure that the constraint $$\sum_s p^s = 1$$

is satisfied by projecting the gradient onto the surface defined by this constraint. This method can be utilized for an optimization method based on the gradient in (Eq. 11) as well. Still, however, both methods will have to ensure the constraint that $p^s \geq 0$ by inspecting the probability parameterization during a gradient update (i.e., a line-search).

Conditional Gaussian Local Gradient

Next, consider a conditional Gaussian (CG) local regression model for the continuous variable $X_v$ given the parents $X_{pa(v)} = (X_{pa(v)}^c, X_{pa(v)}^d)$, where the conditioning parent set may contain continuous variables, $X_{pa(v)}^c$, as well as discrete variables, $X_{pa(v)}^d$. Recall that $\pi_v^d$ denotes a particular configuration of values for discrete parents, and to ease notation, a (instead of $\pi_v^c$ or $x_{pa(v)}^c$) is utilized to denote a particular configuration of values for continuous parents. The CG regression model defines a set of linear regressions on the continuous parent variables—a regression for each configuration of discrete parent variables. See Lauritzen and Wermuth (1989) for more details on CG models. Consider now a particular distribution for $X_v$, given the values a for continuous parents and the configuration of values for discrete parents $\pi_v^d$. The distribution is defined by the mean $\mu = c + \beta a'$ and variance $\sigma$, where c and $\beta$ are respectively the intercept and the coefficients for the regression on continuous parents, and ' denotes transpose. Restricting attention to non-degenerate (or positive) Gaussians, where $\sigma > 0$, an exponential model representation of the form (Eq. 2) is obtained as follows:

$$\theta_{v \mid \pi_v^d} = (\theta_1, \theta_2) = \left(\frac{\mu}{\sigma}, -\frac{1}{2\sigma}\right)$$

$$= \left(\frac{c + \beta a'}{\sigma}, -\frac{1}{2\sigma}\right)$$

$$t(x_v) = (x_v, x_v^2)$$

$$\phi(\theta_{v \mid \pi_v^d}) = -\frac{\theta_1^2}{4\theta_2} - \frac{1}{2} \log(-2\theta_2)$$

$$= \frac{\mu^2}{2\sigma} + \frac{1}{2} \log \sigma$$

$$b(x_v) = (2\pi)^{-1/2}.$$

Notice that the restriction to positive Gaussians ($\sigma > 0$) ensures that the natural parameters for the exponential representation are defined.

The expected value of the canonical statistics is:

$$\tau(\theta_{v \mid \pi_v^d}) = E_{\theta_{v \mid \pi_v^d}}[t(X_v)]$$

$$= (\mu, \sigma + \mu^2)$$

$$= (c + \beta a', \sigma + (c + \beta a')^2).$$

Again, the Lauritzen and Jensen (2001) propagation scheme is utilized to efficiently compute the gradient for the parameters of the exponential model. As with the conditional multinomial case, the inference scheme utilizes a more traditional parameterization for a conditional Gaussian that is different from the subject invention's exponential model. In the case of conditional multinomial models, the subject invention can easily switch between parameterizations. This allows utilization of a gradient method (e.g., a line-search) to update the exponential model parameters and then convert the resulting parameterization back into the propagation scheme parameters in order to compute the next gradient. However, in the case of conditional Gaussian models, the propagation scheme requires the parameters (c, β, σ), and these parameters cannot be obtained from the parameters of the exponential model representation. Therefore, the gradient for these parameters is computed directly.

By inserting the expressions for $t(X_v)$ and $\tau(\theta_{v|\pi_v^d})$ into the equation (Eq. 9) and by utilizing the Jacobian:

$$\frac{\partial \theta_{v|\pi_v^d}}{\partial(c, \beta, \sigma)} = \begin{bmatrix} \frac{1}{\sigma} & \frac{a}{\sigma} & -\frac{c+\beta a'}{\sigma^2} \\ 0 & 0 & \frac{1}{2\sigma^2} \end{bmatrix};$$

the following local gradient with respect to the parameterization (c, β, σ) can be derived. Let μ=c+βa', then:

$$\frac{\partial \log p(y|\theta)}{\partial(c, \beta, \sigma)} = \frac{\partial \log p(y|\theta)}{\partial \theta_{v|\pi_v^d}} \frac{\partial \theta_{v|\pi_v^d}}{\partial(c, \beta, \sigma)} \quad \text{(Eq. 12)}$$

$$= \int p(x_v, a, \pi_v^d | y, \theta) \times \begin{bmatrix} \frac{x_v - \mu}{\sigma} \\ \frac{(x_v - \mu)a}{\sigma} \\ \frac{(x_v - \mu)^2 - \sigma}{2\sigma} \end{bmatrix}' \mu(x_v, a)$$

$$= p(\pi_v^d | y, \theta) \int p(x_v, a | \pi_v^d, y, \theta) \times \begin{bmatrix} \frac{x_v - \mu}{\sigma} \\ \frac{(x_v - \mu)a}{\sigma} \\ \frac{(x_v - \mu)^2 - \sigma}{2\sigma} \end{bmatrix}' \mu(x_v, a); \quad \text{(Eq. 13)}$$

where $p(x_v, a|\pi_v^d, y, \theta)=0$ for values of discrete parents $\pi_v^d$ not consistent with the incomplete observation y. The step from (Eq. 12) to (Eq. 13) follows by factoring $p(x_v, a, \pi_v^d|y, \theta)$ into $p(x_v, a|\pi_v^d, y, \theta)$ and $p(\pi_v^d|y, \theta)$ and then pulling the discrete density out from under the integration.

Let $(x_v^*, a^*)$ denote the expected value for the vector $(X_v, X_{pa(v)}^c)$ with respect to the posterior Gaussian distribution for $(X_v, X_{pa(v)}^c)$ given $\pi_v^d$. That is, $$(x_v^*, a^*) = E_{(c,\beta,\sigma)}[X_v, X_{pa(v)}^c | y]$$

$$= E_{\theta_{v|\pi_v^d}}[X_v, X_{pa(v)}^c | y]$$

$$= \int p(x_v, a | \pi_v^d, y, \theta)(x_v, a)\mu(x_v, a).$$

Similarly, let $((x_v, a)'(x_v, a))^*$ denote the expected value for the matrix $((X_v, X_{pa(v)}^c)'(X_v, X_{pa(v)}^c))$. For instance, $$(x_v a)^* = E_{(c,\beta,\sigma)}[X_v X_{pa(v)}^c | y]$$

$$= E_{\theta_{v|\pi_v^d}}[X_v X_{pa(v)}^c | y).$$

The expression for the local gradient in (Eq. 13) then reduces to:

$$\frac{\partial \log p(y|\theta)}{\partial c} = p(\pi_v^d | y, \theta)(x_v^* - \beta a^* - c)/\sigma \quad \text{(Eq. 14)}$$

$$\frac{\partial \log p(y|\theta)}{\partial \beta} = p(\pi_v^d | y, \theta)((x_v a)^* - ca^* - \beta(a'a)^*)/\sigma$$

$$\frac{\partial \log p(y|\theta)}{\partial \sigma} = p(\pi_v^d | y, \theta)((x_v x_v)^* - 2cx_v^* - 2\beta(x_v a')^* +$$

$$\beta(a'a)^*\beta' + 2c\beta(a^*)' + c^2 - \sigma)/2\sigma^2.$$

The Lauritzen and Jensen (2001) propagation scheme can now be utilized to efficiently compute the gradient for CG regression models. Recall that the propagation scheme allows the posterior marginal distributions for any family $X_{v \cup pa(v)}$ to be computed efficiently, where this distribution is represented as the product of the marginal distribution for discrete variables, $p(X_{pa(v)}^d)$, and the conditional Gaussian $p(X_v, X_{pa(v)}^c | X_{pa(v)}^d)$. Given a particular configuration for the discrete variables, $\pi_v^d$, the mean vector μ* and covariance matrix Σ* for this conditional Gaussian equals:

$$\mu^* = (x_v^*, a^*)$$

$$\Sigma^* = ((X_v, a)'(x_v, a))^* - (\mu^*)'\mu^*.$$

The expected statistics on the right-hand side of (Eq. 14) can therefore easily be extracted from the parameterization of the marginal distribution and hence, the gradient for a CG regression can be efficiently computed. Notice that the matrix:

$$((x_v, a)'(x_v, a))^* = \Sigma^* + (\mu^*)'\mu^*;$$

partitions as:

| $(x_v x_v)^*$ | $(x_v a)^*$ |
|---|---|
| $(x_v a')^*$ | $(a'a)^*$ |

Now, consider multiple independent observations $y^1, \ldots, y^n$, where each $y^l$, $l=1, \ldots, n$, is a potential incomplete observation with respect to the variables of interest X. Let the expected posterior sum be defined as:

$$(n^*(x_v), n^*(a)) = \sum_{l=1}^{n} p(\pi_v^d | y^l, \theta) E_{(c,\beta,\sigma)}[X_v, X_{pa(v)}^c | y^l].$$

Similarly let the expected posterior sum of squares be defined as:

$$\begin{bmatrix} n^*(x_v x_v) & n^*(x_v a)) \\ n^*(x_v a') & n^*(a' a) \end{bmatrix} = \sum_{l=1}^{n} p(\pi_v^d \mid y^l, \theta) \begin{bmatrix} E_{(c,\beta,\sigma)}[X_v X_v \mid y^l] & E_{(c,\beta,\sigma)}[X_v X_{pa(v)}^c \mid y^l] \\ E_{(c,\beta,\sigma)}[X_v X_{pa(v)}^c{}' \mid y^l] & E_{(c,\beta,\sigma)}[X_{pa(v)}^c{}' X_{pa(v)}^x \mid y^l] \end{bmatrix}.$$

Given a sample of incomplete observations, the parameter gradient for a conditional Gaussian can now be determined as:

$$\frac{\partial \log p(y^l, \ldots, y^n \mid \theta)}{\partial c} = (n^*(x_v) - \beta n^*(a) - nc)/\sigma$$

$$\frac{\partial \log p(y^l, \ldots, y^n \mid \theta)}{\partial \beta} = (n^*(x_v a) - cn^*(a) - \beta n^*(a'a))/\sigma$$

$$\frac{\partial \log p(y^l, \ldots, y^n \mid \theta)}{\partial \sigma} = (n^*(x_v x_v) - 2cn^*(x_v) - 2\beta n^*(x_v a') + \beta n^*(a'a)\beta' + 2c\beta n(a') + nc^2 - n\sigma)/\sigma$$

Alternatively, gradients can be determined by adding up gradients for the individual observations. That is:

$$\frac{\partial \log p(y^l, \ldots, y^n \mid \theta)}{\partial (c, \beta, \sigma)} = \sum_{l=1}^{n} \frac{\partial \log p(y^l \mid \theta)}{\partial (c, \beta, \sigma)}.$$

Parameter Tying

Tying of parameters is an essential feature for some types of models, including, for example, models for stochastic temporal processes and pedigree analysis. Parameter tying that relaxes the global variation independence in (Eq. 1) is considered by assuming that the parameterization for the relationship between the variable $X_v$ and its conditional variables $X_{pa(v)}$ is the same across a set of variables. Let $\tilde{v} \subseteq V$ denote such a set of variables and let $\tilde{V}$ denote all of such sets. Let $\theta_{\tilde{v}}$ denote the tied parameterization across all $v \in \tilde{v}$. In this case, the model factorizes as:

$$p(X \mid \theta) = \prod_{v \in V} p(X_v \mid X_{pa(v)}, \theta_{\tilde{v}});$$ (Eq. 15)

where $\Theta = \times_{\tilde{v} \in \tilde{V}} \Theta_{\tilde{v}}$. This type of tying is called global parameter tying. Global parameter tying is, of course, only possible between conditional models that are similar. That is, for all $X_v$, where $v \in \tilde{v}$, the number of discrete and continuous conditioning parent variables must be the same and the set of possible state configurations for discrete parents must be the same. Let $\pi_v^d$ denote a particular configuration of states for discrete parent variables. This configuration is the same across all $v \in \tilde{v}$.

The incomplete-data log-likelihood with respect to the parameterization $\theta_{v \mid \pi_v^d}$ is now sought. Similar to (Eq. 6) and (Eq. 7), the chain rule and exponential model representation can be utilized to first compute the local gradient for a complete observation:

$$\frac{\partial p(x \mid \theta_{\tilde{v}})}{\partial \theta_{v \mid \pi_v^d}} = \sum_{v \in \tilde{v}} p(x \mid \theta) \frac{\partial \log p(x_v \mid x_{pa(v)}, \theta_{v \mid \pi_v^d})}{\partial \theta_{v \mid \pi_v^d}}$$

$$= \sum_{v \in \tilde{v}} p(x \mid \theta) I_v^{\pi_v^d}(x_{pa(v)}) \big(t(x_v) - \tau(\theta_{v \mid \pi_v^d})\big).$$

The expression for the local gradient for the incomplete data log-likelihood is then obtained by the same steps which lead to (Eq. 8) and (Eq. 9). Hence, $$\frac{\partial \log p(y \mid \psi)}{\partial \psi} = \sum_{v \in \tilde{v}} \int p\big(x_v, x_{pa(v)}^c, \pi_{v \mid \pi_v^d} \mid y, \theta\big)\big(t(x_v) - \tau(\theta_{v \mid \pi_v^d})\big) \times \frac{\partial \theta_{v \mid \pi_v^d}}{\partial \psi} \mu(x_v, x_{pa(v)}^c).$$ (Eq. 16)

Setting $$\frac{\partial \theta_{v \mid \pi_v^d}}{\partial \psi} = 1$$

gives the expression for the gradient with respect to the natural parameters in the exponential model representation.

Notice that the only difference between (Eq. 9) and (Eq. 16) is that the gradient in (Eq. 16) adds the gradients computed at each $v \in \tilde{v}$. In other words, with global parameter tying, the gradient for the incomplete-data log-likelihood can be computed by proceeding as if parameters were not tied and then add up the gradients which are related by tying. That is, $$\frac{\partial \log p(y \mid \psi)}{\partial \psi} = \sum_{v \in \tilde{v}} \frac{\partial \log p(y \mid \psi_{v \mid \pi_v^d})}{\partial \psi_{v \mid \pi_v^d}};$$ (Eq. 17)

where $\psi_{v \mid \pi_v^d}$ denotes the (artificial) non-tied parameterization for the local model, with $\psi_{v \mid \pi_v^d} = \psi$ for all $v \in \tilde{v}$. For simplicity, only the global parameter tying example is illustrated. More sophisticated tying schemes are, of course, possible.

Parameter Fixing

Some parameters in a model can also be fixed to a specific value (as opposed to tying or setting two parameters equal). This excludes these parameters from the set of free parameters for which the gradient is computed, allowing for reduced computational complexity. Statistical models can utilize different fixed parameters to create variations of the model, useful in determining other parameters.

Stochastic ARMA Models

The stochastic ARMA ($\sigma$ ARMA) models of Thiesson et al. (2004) is an illustrative example of a stochastic temporal process, where tying of parameters and parameter fixing plays an important role. $\sigma$ ARMA models are closely related to the classic autoregressive moving average (ARMA) time-series models (see, e.g., (Box, G. E. P., Jenkins, G. M., and Reinsel, G. C.; *Time Series Analysis;* New Jersey: Prentice Hall; 1994) or (Ansley, C. F.; An Algorithm For The Exact Likelihood Of A Mixed Autoregressive-Moving Average Process; *Biometrika* 66, 59-65; 1979)). As demonstrated in Thiesson et al. (2004), both the ARMA and ar ARMA models are naturally represented as graphical models with only continuous variables. The σ ARMA models differs from the ARMA models by replacing the deterministic component of an ARMA model with a Gaussian distribution having a small variance, as is shown infra. This variation allows the time series model to be smoothed in a controlled way.

A σ ARMA(p,q) time-series model is defined as follows. A temporal sequence of continuous observation variables is denoted by $Y=(Y_1,Y_2,\ldots,Y_T)$. Time-series data is a sequence of values for these variables—some of which may be missing. The models associate a latent "white noise" variable with each observable variable. These latent variables are denoted $E=(E_1,E_2,\ldots,E_T)$.

The ar ARMA model is now defined by the conditional Gaussian distribution:

$$Y_t | Y_{t-p},\ldots,Y_{t-1}, E_{t-q},\ldots,E_t \sim N(\mu_t,\sigma); \qquad \text{(Eq. 18)}$$

where the functional expression for the mean $\mu_t$ and the variance σ are shared across the observation variables. The variance is fixed at a given (small) value to be specified by the user. The mean is related to the conditional variables as follows:

$$\mu_t = c + \sum_{j=0}^{q} \beta_j E_{t-j} + \sum_{i=1}^{p} \alpha_i Y_{t-i}; \qquad \text{(Eq. 19)}$$

where c is the intercept for the regression, $$\sum_{i=1}^{p} \alpha_i Y_{t-i}$$

is the autoregressive (AR) part, $$\sum_{j=0}^{q} \beta_j E_{t-j}$$

is the moving average (MA) part with $\beta_0$ fixed as 1, and $E_t \sim N(0,\gamma)$ with $E_t$ mutually independent for all t. The model therefore involves the free parameters c, $(\alpha_1,\ldots,\alpha_p)$, $(\beta_1,\ldots,\beta_q)$, and γ. These parameters are tied across time steps.

From the above description, one may realize that an ARMA model is the limit of a σ ARMA model as σ→0. Letting σ→0 will in effect replace the conditional Gaussian distribution in (Eq. 18) by a deterministic relation, where $Y_t$ equals the right-hand side of (Eq. 19).

Figure 5:
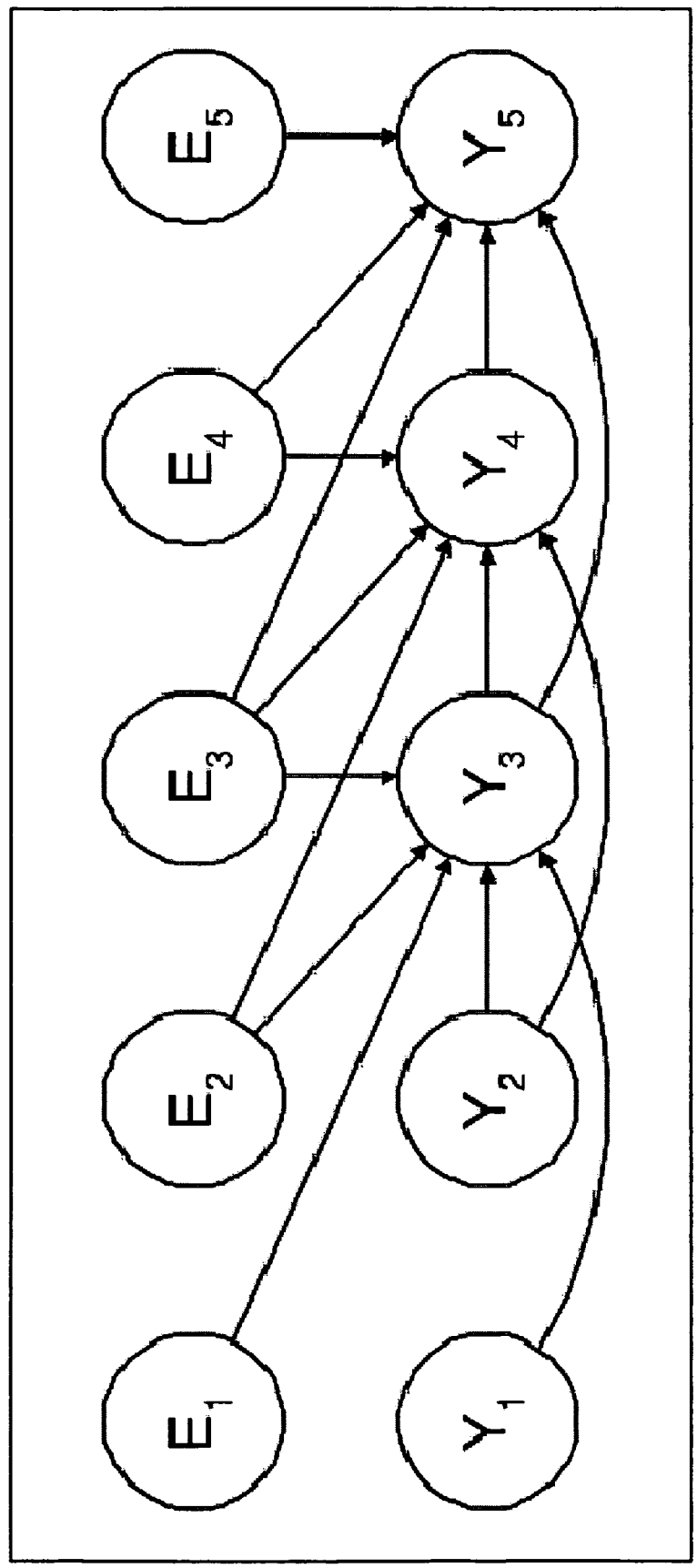
FIG. 5 is an illustration of a stochastic ARMA (σARMA) time series in accordance with an aspect of the subject invention.

The gradient for the conditional log-likelihood model, conditioned on the first R=max(p, q) variables, is desired. Relations between variables for t≦R can therefore be ignored. A graphical representation 500 for an σ ARMA(2,2) model is shown in FIG. 5. It should be noted that if the time series is artificially extended back in time for R (unobserved) time steps, this model represents what is known in the literature as the exact likelihood model. There are alternative methods for dealing with the beginning of a time series (see, e.g., Box, Jenkins, and Reinsel 1994).

First consider the variance parameter γ, which is tied across all the "white noise" variables $E_R, E_{R+1},\ldots,E_T$. It is desired to utilize Eq. 17 to compute the partial gradient for this parameter and, therefore, the expression for a partial gradient is first derived under the assumption that the γ parameters for these variables are not tied. Notice that γ will, in this case, take the place of the variance parameter σ in all of the formulas found supra. Also, recall that the "white noise" variables do not have any parents, which means that there are no regression coefficients and hence no partial derivative with respect to β. Because the Gaussian distribution is restricted to have a mean of zero, the chain-rule is invoked once more and the gradient expression in (Eq. 14) is multiplied by the Jacobian [0 1]' going from the (c,γ) parameterization to a parameterization, where γ is the only parameter. Notice that because the Jacobian is constant with respect to the integral in (Eq. 13), the parameter gradient can be computed by simply multiplying the Jacobian and equation (Eq. 14). As expected, a partial gradient for the non-tied variance of $E_t$ is obtained that equals the partial derivative for the variance parameter in (Eq. 14)—but it is not quite as complicated because c=0 and $E_t$ has no parents. Finally, by utilizing (Eq. 17), the expression for the partial gradient with respect to the tied γ parameter is obtained:

$$\frac{\partial \log p(y|\theta)}{\partial \gamma} = \sum_{t=R+1}^{T} \frac{(e_t e_t)^* - \gamma}{2\gamma^2}. \qquad \text{(Eq. 20)}$$

In a similar fashion, the gradient for the free parameters c, $(\alpha_1,\ldots,\alpha_p)$, and $(\beta_1,\ldots,\beta_q)$ associated with the conditional Gaussian distribution for the observation variables are derived. As above, the chain rule is applied to achieve the gradient for the free parameters. Let $A_t=(Y_{t-p},\ldots,Y_{t-1}, E_{t-q},\ldots,E_t)$ denote all the parents for the observation variable $Y_t$ and let $Z_t=A_t \setminus E_t$ denote the parents except for the parent $E_t$ associated with the fixed regression coefficient $\beta_0$. All of the regression coefficients are denote by $\beta=(\alpha_1,\ldots,\alpha_p,\beta_0,\beta_1,\ldots,\beta_q)$ and let $\beta_{z_t}=(\alpha_1,\ldots,\alpha_p,\beta_1,\ldots,\beta_q)$ denote the free regression coefficients. The expression for the partial gradient for the tied c and $\beta_{z_t}$ parameters now becomes:

$$\frac{\partial \log p(y|\theta)}{\partial (c,\beta_{z_t})} = \sum_{t=R+1}^{T} \begin{bmatrix} (x_t^* - \beta a_t^* - c)/\sigma \\ ((x_t z_t)^* - c(z_t)^* - \beta_{z_t}(z_t' z_t)^*)/\sigma \end{bmatrix}'.$$

The subject invention illustrates derivation of the gradient for recursive exponential mixed models, a class of probabilistic models with both discrete and continuous variables. It is shown that positive conditional Gaussian models are a specific subclass of the REMMs and that one can utilize probabilistic inference to compute the parameter gradient for the incomplete-data likelihood for these models. As described supra, one can utilize this gradient to adapt the parameters in order to improve the incomplete-data likelihood and identify the MLE or local maxima of the likelihood. It is easy to extend this analysis to obtain similar results for MAP estimation by differentiating a prior with respect to the parameters of interest.

Alternative methods for learning parameters that do not directly compute the parameter gradient also exist. For instance, the EM algorithm is a general method for improving parameters of a statistical model given incomplete data. In the context of graphical models, the E-step of the EM algorithm is accomplished via probabilistic inference in the graphical model (for a treatment of the EM algorithm for discrete graphical models see, e.g., Lauritzen, S. L.; The EM Algorithm for Graphical Association Models with Missing Data; *Computational Statistics & Data Analysis,* 19, 191-201; 1995). It should be noted, however, that in many situations, one can improve the speed of convergence of the EM algorithm through the use of the gradient (see, e.g., Thiesson, R.; Accelerated Quantification of Bayesian Networks with Incomplete Data; *Proceedings of First International Conference on Knowledge Discovery and Data Mining* (pp. 306-311); AAAI Press; 1995). Also, in some situations, the EM algorithm cannot be applied to improve the parameters of the model. In such situations a gradient method can often be used instead.

It is important to note that CG models that involve local degenerate conditional Gaussian models cannot be expressed as REMMs. The requirement for non-degenerate conditional Gaussians, where the variance σ>0, can be seen by examining the exponential parameterization of the conditional Gaussian local model. Some standard models, therefore, cannot be naturally expressed as REMMs. For instance, the ARMA (a stochastic ARMA model in which the variance σ is zero) cannot be represented as a CG model.

Figure 6:
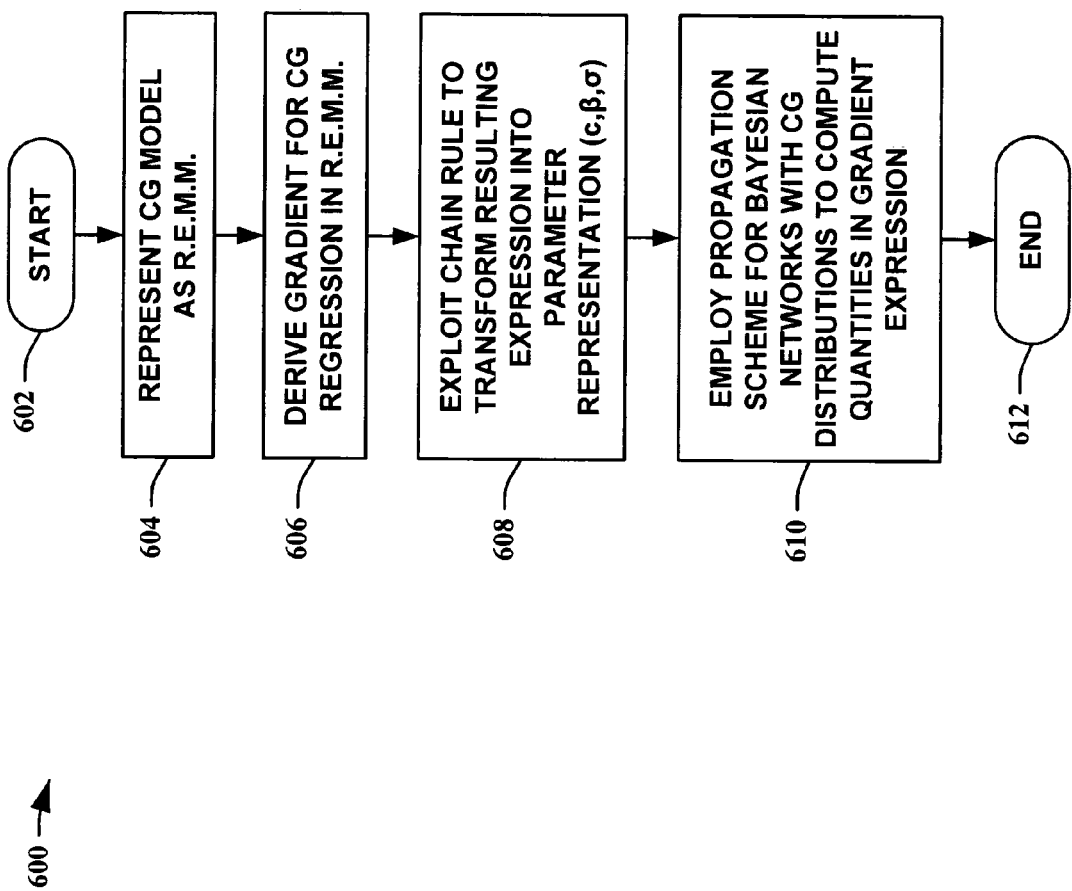
FIG. 6 is a flow diagram of a method of facilitating gradient determination for a conditional Gaussian local gradient in accordance with an aspect of the subject invention.
Figure 7:
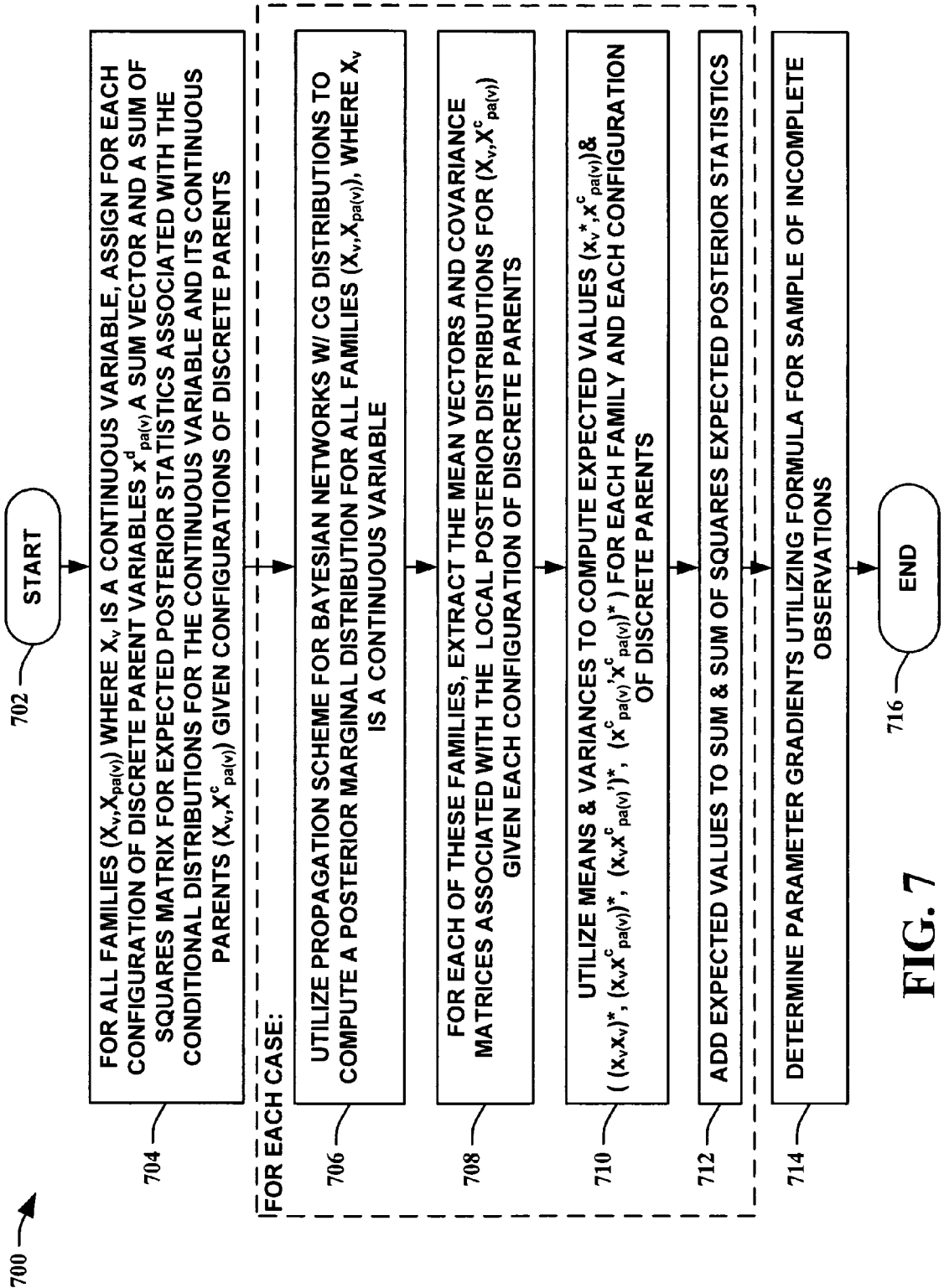
FIG. 7 is another flow diagram of a method of facilitating gradient determination for a conditional Gaussian local gradient in accordance with an aspect of the subject invention.
Figure 8:
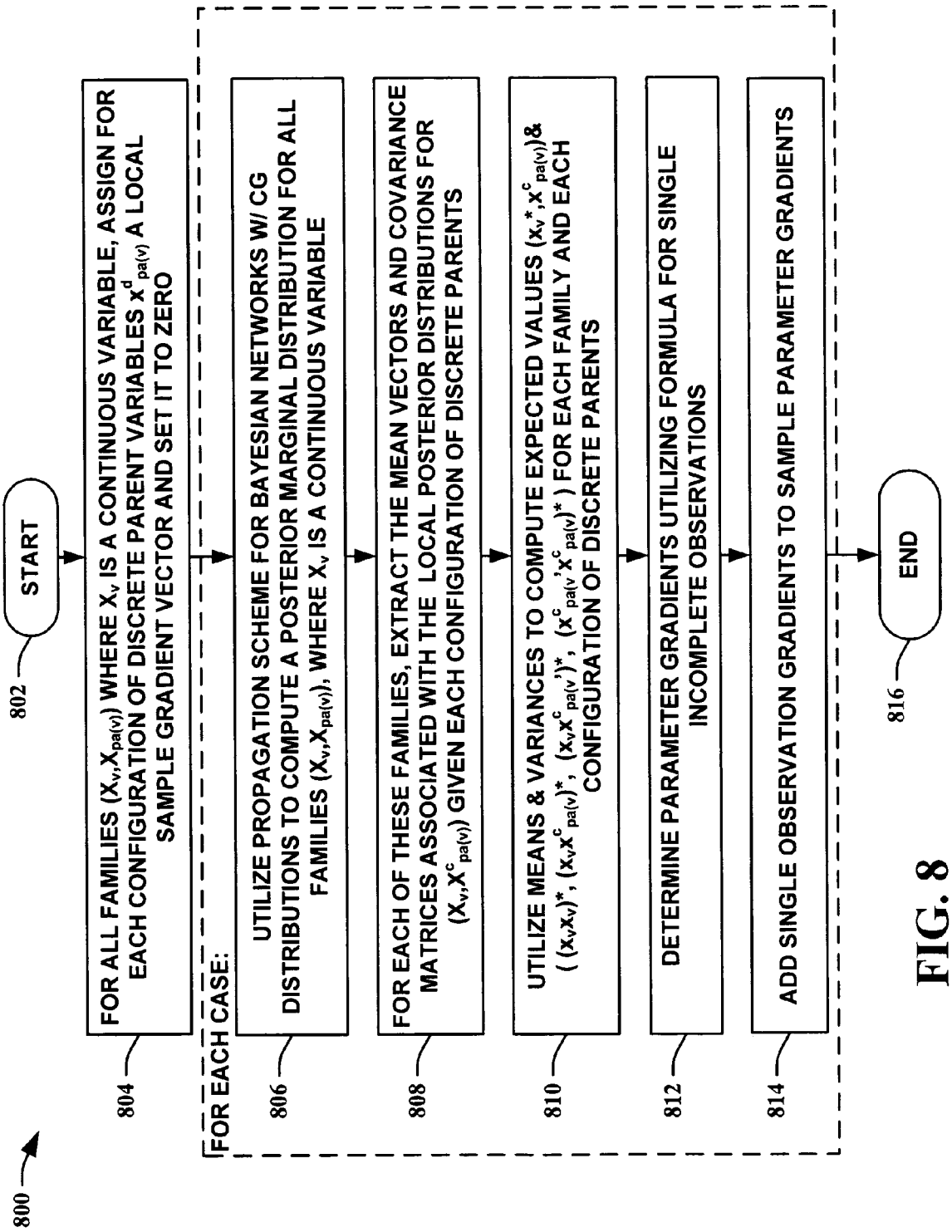
FIG. 8 is yet another flow diagram of a method of facilitating gradient determination for a conditional Gaussian local gradient in accordance with an aspect of the subject invention.

In view of the exemplary systems shown and described above, methodologies that may be implemented in accordance with the present invention will be better appreciated with reference to the flow charts of FIGS. 6-8. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodologies in accordance with the present invention.

The invention may be described in the general context of computer-executable instructions, such as program modules, executed by one or more components. Generally, program modules include routines, programs, objects, data structures, etc., that perform particular tasks or implement particular abstract data types. Typically, the functionality of the program modules may be combined or distributed as desired in various instances of the present invention.

In FIG. 6, a flow diagram of a method 600 of facilitating gradient determination for a conditional Gaussian local gradient in accordance with an aspect of the subject invention is shown. The method 600 starts 602 by representing a conditional Gaussian model as a recursive exponential mixed model (REMM) 604. A parameter gradient is then derived for the conditional Gaussian regression in the REMM representation model 606. The chain rule is then exploited to transform the resulting expression into a parameter representation of c, β, and σ 608. Probabilistic inference is then utilized such as, for example, a propagation scheme for Bayesian networks with conditional Gaussian distributions, to compute quantities in the parameter gradient expression 610, ending the flow 612.

Referring to FIG. 7, another flow diagram of a method 700 of facilitating gradient determination for a conditional Gaussian local gradient in accordance with an aspect of the subject invention is depicted. The method 700 starts 702 by, for all families $(X_v, X_{pa(v)})$ where $X_v$ is a continuous variable, assigning for each configuration of discrete parent variables $x^d_{pa(v)}$ a sum vector and a sum of squares matrix for expected posterior statistics associated with the conditional distributions for the continuous variable and its continuous parents $(X_v, X^c_{pa(v)})$ given configurations of discrete parents 704. A propagation scheme for Bayesian networks with conditional Gaussian distributions such as, for example, the Lauritzen and Jensen (2001) algorithm, is then utilized to compute a posterior marginal distribution for all families $(X_v, X_{pa(v)})$, where $X_v$ is a continuous variable 706. The mean vectors and covariance matrices associated with the local posterior distributions for $(X_v, X^c_{pa(v)})$ given each configuration of discrete parents are then extracted for each of these families 708. The means and variances are then utilized to compute the expected values $(x_v^*, x^c_{pa(v)})$ and $((x_v x_v)^*, (x_v x^c_{pa(v)})^*, (x_v X^c_{pa(v)}')^*, (x^c_{pa(v)}' x^c_{pa(v)})^*)$ for continuous variables in each of these families given each configuration of discrete variables in the respective families 710. The expected values are then added to the sum and the sum of squares expected posterior statistics 712. Once the prior four steps have been completed for each case, the parameter gradients are then determined utilizing the formula for the sample of incomplete observations 714, ending the flow 716.

Looking at FIG. 8, yet another flow diagram of a method 800 of facilitating gradient determination for a conditional Gaussian local gradient in accordance with an aspect of the subject invention is illustrated. The method 800 starts 802 by, for all families $(X_v, X_{pa(v)})$ where $X_v$ is a continuous variable, assigning for each configuration of discrete parent variables $x^d_{pa(v)}$ a local sample gradient vector and setting it to zero 804. The following steps are accomplished for each case. A propagation scheme for Bayesian networks with conditional Gaussian distributions such as, for example, the Lauritzen and Jensen (2001) algorithm, is then utilized to compute a posterior marginal distribution for all families $(X_v, X_{pa(v)})$, where $X_v$ is a continuous variable 806. The mean vectors and covariance matrices associated with the local posterior distributions for $(X_v, X^c_{pa(v)})$ given each configuration of discrete parents are then extracted for each of these families 808. The means and variances are then utilized to compute the expected values $(x_v^*, x^c_{pa(v)})$ and $((x_v x_v)^*, (x_v x^c_{pa(v)})^*, (x_v x^c_{pa(v)}')^*, (x^c_{pa(v)} x^c_{pa(v)})^*)$ for continuous variables in each of these families given each configuration of discrete variables in the respective families 810. The parameter gradients are then determined utilizing the formula for the sample of incomplete observations 812. The single observation gradients are then added to the sample parameter gradients 814, ending the flow 816.

Figure 9:
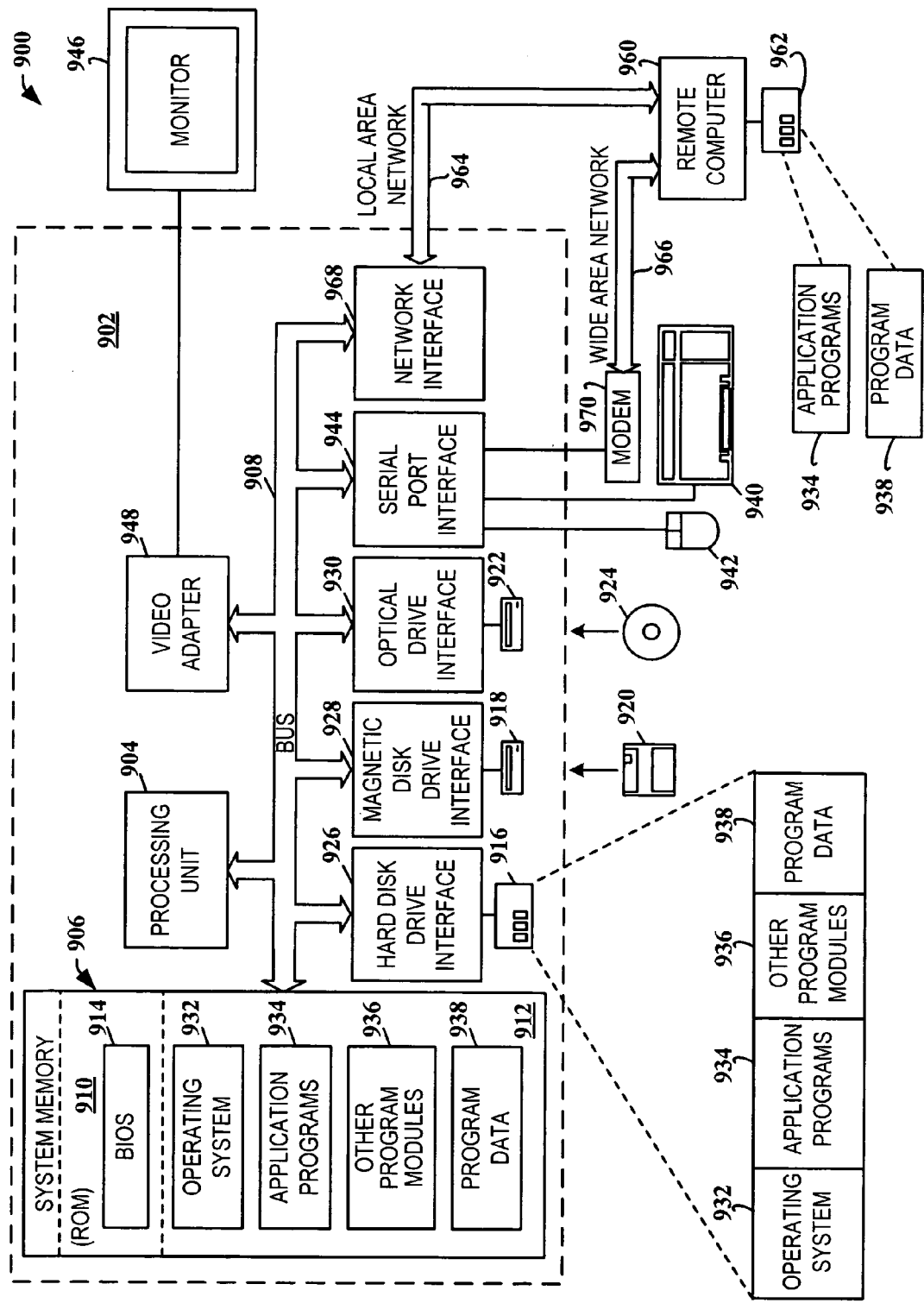
FIG. 9 illustrates an example operating environment in which the subject invention can function.

In order to provide additional context for implementing various aspects of the present invention, FIG. 9 and the following discussion is intended to provide a brief, general description of a suitable computing environment 900 in which the various aspects of the present invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc., that perform particular tasks and/or implement particular abstract data types. Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules may be located in local and/or remote memory storage devices.

As used in this application, the term "component" is intended to refer to a computer-related entity, either hardware, a combination of hardware and software, software, or software in execution. For example, a component may be, but is not limited to, a process running on a processor, a processor, an object, an executable, a thread of execution, a program, and a computer. By way of illustration, an application running on a server and/or the server can be a component. In addition, a component may include one or more subcomponents.

With reference to FIG. 9, an exemplary system environment 900 for implementing the various aspects of the invention includes a conventional computer 902, including a processing unit 904, a system memory 906, and a system bus 908 that couples various system components, including the system memory, to the processing unit 904. The processing unit 904 may be any commercially available or proprietary processor. In addition, the processing unit may be implemented as multi-processor formed of more than one processor, such as may be connected in parallel.

The system bus 908 may be any of several types of bus structure including a memory bus or memory controller, a peripheral bus, and a local bus using any of a variety of conventional bus architectures such as PCI, VESA, Microchannel, ISA, and EISA, to name a few. The system memory 906 includes read only memory (ROM) 910 and random access memory (RAM) 912. A basic input/output system (BIOS) 914, containing the basic routines that help to transfer information between elements within the computer 902, such as during start-up, is stored in ROM 910.

The computer 902 also may include, for example, a hard disk drive 916, a magnetic disk drive 918, e.g., to read from or write to a removable disk 920, and an optical disk drive 922, e.g., for reading from or writing to a CD-ROM disk 924 or other optical media. The hard disk drive 916, magnetic disk drive 918, and optical disk drive 922 are connected to the system bus 908 by a hard disk drive interface 926, a magnetic disk drive interface 928, and an optical drive interface 930, respectively. The drives 916-922 and their associated computer-readable media provide nonvolatile storage of data, data structures, computer-executable instructions, etc. for the computer 902. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, can also be used in the exemplary operating environment 900, and further that any such media may contain computer-executable instructions for performing the methods of the present invention.

A number of program modules may be stored in the drives 916-922 and RAM 912, including an operating system 932, one or more application programs 934, other program modules 936, and program data 938. The operating system 932 may be any suitable operating system or combination of operating systems. By way of example, the application programs 934 and program modules 936 can include a statistical modeling facilitating scheme in accordance with an aspect of the present invention.

A user can enter commands and information into the computer 902 through one or more user input devices, such as a keyboard 940 and a pointing device (e.g., a mouse 942). Other input devices (not shown) may include a microphone, a joystick, a game pad, a satellite dish, a wireless remote, a scanner, or the like. These and other input devices are often connected to the processing unit 904 through a serial port interface 944 that is coupled to the system bus 908, but may be connected by other interfaces, such as a parallel port, a game port or a universal serial bus (USB). A monitor 946 or other type of display device is also connected to the system bus 908 via an interface, such as a video adapter 948. In addition to the monitor 946, the computer 902 may include other peripheral output devices (not shown), such as speakers, printers, etc.

It is to be appreciated that the computer 902 can operate in a networked environment using logical connections to one or more remote computers 960. The remote computer 960 may be a workstation, a server computer, a router, a peer device or other common network node, and typically includes many or all of the elements described relative to the computer 902, although for purposes of brevity, only a memory storage device 962 is illustrated in FIG. 9. The logical connections depicted in FIG. 9 can include a local area network (LAN) 964 and a wide area network (WAN) 966. Such networking environments are commonplace in offices, enterprise-wide computer networks, intranets and the Internet.

When used in a LAN networking environment, for example, the computer 902 is connected to the local network 964 through a network interface or adapter 968. When used in a WAN networking environment, the computer 902 typically includes a modem (e.g., telephone, DSL, cable, etc.) 970, or is connected to a communications server on the LAN, or has other means for establishing communications over the WAN 966, such as the Internet. The modem 970, which can be internal or external relative to the computer 902, is connected to the system bus 908 via the serial port interface 944. In a networked environment, program modules (including application programs 934) and/or program data 938 can be stored in the remote memory storage device 962. It will be appreciated that the network connections shown are exemplary and other means (e.g., wired or wireless) of establishing a communications link between the computers 902 and 960 can be used when carrying out an aspect of the present invention.

In accordance with the practices of persons skilled in the art of computer programming, the present invention has been described with reference to acts and symbolic representations of operations that are performed by a computer, such as the computer 902 or remote computer 960, unless otherwise indicated. Such acts and operations are sometimes referred to as being computer-executed. It will be appreciated that the acts and symbolically represented operations include the manipulation by the processing unit 904 of electrical signals representing data bits which causes a resulting transformation or reduction of the electrical signal representation, and the maintenance of data bits at memory locations in the memory system (including the system memory 906, hard drive 916, floppy disks 920, CD-ROM 924, and remote memory 962) to thereby reconfigure or otherwise alter the computer system's operation, as well as other processing of signals. The memory locations where such data bits are maintained are physical locations that have particular electrical, magnetic, or optical properties corresponding to the data bits.

Figure 10:
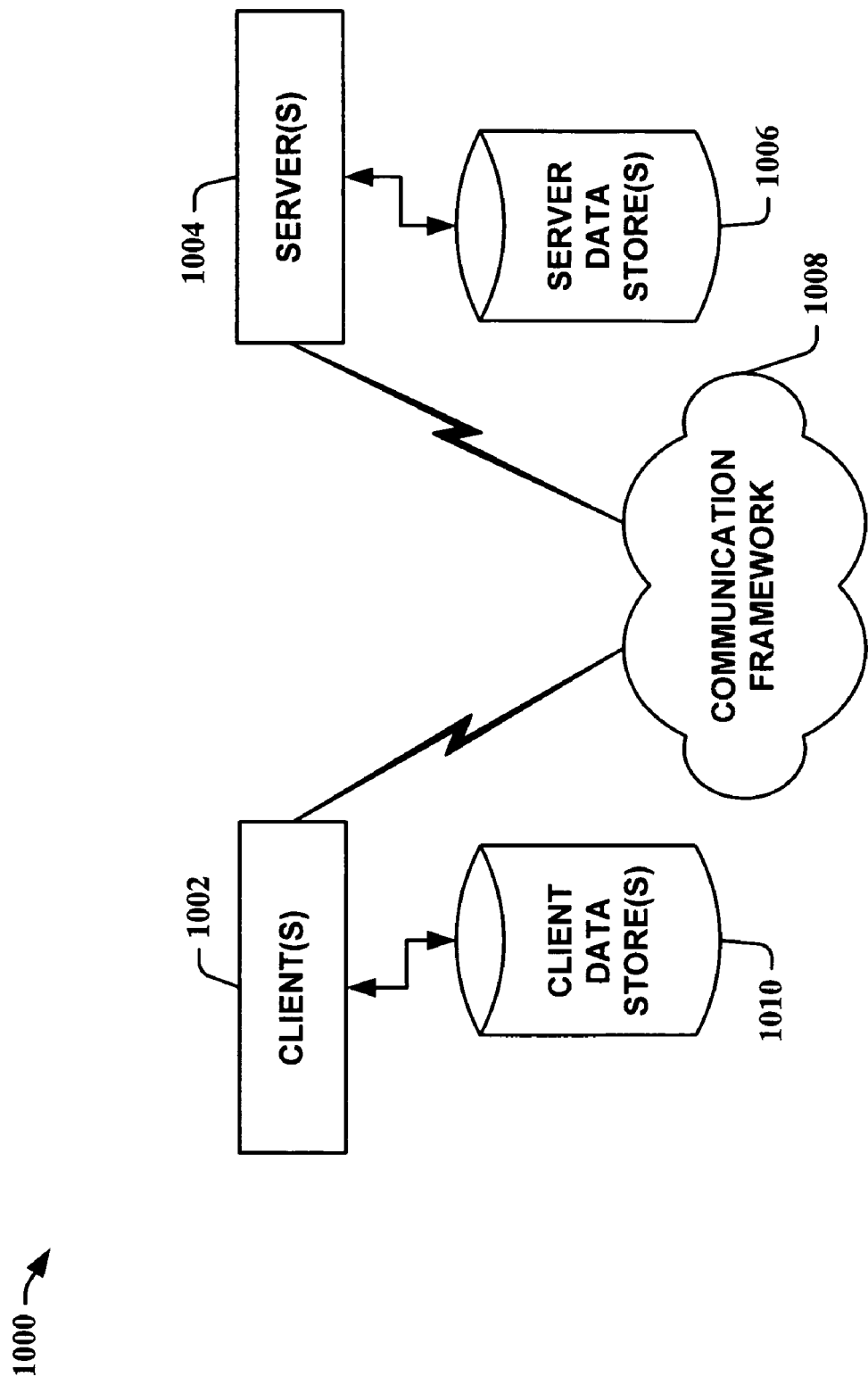
FIG. 10 illustrates another example operating environment in which the subject invention can function.

FIG. 10 is another block diagram of a sample computing environment 1000 with which the present invention can interact. The system 1000 further illustrates a system that includes one or more client(s) 1002. The client(s) 1002 can be hardware and/or software (e.g., threads, processes, computing devices). The system 1000 also includes one or more server(s) 1004. The server(s) 1004 can also be hardware and/or software (e.g., threads, processes, computing devices). One possible communication between a client 1002 and a server 1004 may be in the form of a data packet adapted to be transmitted between two or more computer processes. The system 1000 includes a communication framework 1008 that can be employed to facilitate communications between the client(s) 1002 and the server(s) 1004. The client(s) 1002 are connected to one or more client data store(s) 1010 that can be employed to store information local to the client(s) 1002. Similarly, the server(s) 1004 are connected to one or more server data store(s) 1006 that can be employed to store information local to the server(s) 1004.

In one instance of the present invention, a data packet transmitted between two or more computer components that facilitates statistical modeling is comprised of, at least in part, information relating to a gradient determination system that determines gradients for a log-likelihood of a conditional Gaussian graphical model from a data set of a set of variables and probabilistic inference over those variables with at least one continuous variable and with incomplete observation data for at least one of the variables.

It is to be appreciated that the systems and/or methods of the present invention can be utilized in statistical modeling facilitating computer components and non-computer related components alike. Further, those skilled in the art will recognize that the systems and/or methods of the present invention are employable in a vast array of electronic related technologies, including, but not limited to, computers, servers and/or handheld electronic devices, and the like.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A system that facilitates statistical modeling in an artificial intelligence application, comprising
a processor;
a memory communicatively coupled to the processor, the memory having stored therein computer-executable instructions configured to implement the system, including:
a gradient determination component that utilizes a data set for a set of variables and probabilistic inference to determine parameter gradients for a log-likelihood of a conditional Gaussian (CG) graphical model over those variables with at least one continuous variable and with incomplete observation data for at least one of the variables, the CG graphical model employed to deduce a cause of a given outcome represented by the data set;
wherein the parameter gradients comprise conditional multinomial local gradients and at least one conditional Gaussian local gradient, the gradient determination component determines the conditional multinomial local gradients by performing a line search to update the parameters of an exponential model representation, converting the updated parameterization to a non-exponential representation, and utilizing a propagation scheme on the non-exponential representation to compute the next gradient.

2. The system of claim 1 employed by a gradient-based optimization process that iteratively adapts parameters of a model to improve incomplete data log-likelihood.

3. The system of claim 2, the gradient-based optimization process comprising a conjugate gradient process.

4. The system of claim 1, the gradient determination component utilizes a Recursive Exponential Mixed Model (REMM) representation of the CG graphical model to facilitate in determining the parameter gradients, the Recursive Exponential Mixed Model has both continuous and discrete variables and is defined in terms of local models represented as regular exponential models that satisfy global and partial local variation independence.

5. The system of claim 1, the gradient determination component determines parameter gradients of a graphical model with at least two equal parameters.

6. The system of claim 1, the gradient determination component determines parameter gradients of a graphical model with at least one parameter fixed to a specific value.

7. The system of claim 1, the gradient determination component determines parameter gradients of a graphical model with at least one parameter fixed to a specific value and with at least two equal parameters.

8. The system of claim 7, the graphical model comprising a stochastic autoregressive moving average model.

9. The system of claim 1, the gradient determination component employs an exponential model representation that automatically enforces that $p^s \geq 0$ and $$\sum_s p^s = 1$$

to facilitate in optimizing at least one gradient parameter.

10. The system of claim 1, the incomplete observation data comprising data that is incomplete in a non-informative manner.

11. The system of claim 1, the probabilistic inference comprising a propagation scheme for Bayesian networks with conditional Gaussian distributions.

12. A method for facilitating statistical modeling in an artificial intelligence application, comprising:
employing a processor executing computer-executable instructions stored on a computer-readable storage medium to implement the following acts:
receiving at least one data set representing an outcome, the at least one data set having incomplete observation data for a set of variables with at least one continuous variable;
utilizing the data set and probabilistic inference to determine parameter gradients for a log-likelihood of a conditional Gaussian (CG) graphical model over those variables;
representing the CG graphical model as a recursive exponential mixed model (REMM);
determining a conditional Gaussian regression in the REMM representation model;

utilizing a chain rule to transform a resulting parameter gradient expression into a parameter representation of c, β, and σ, representing an intercept, coefficients, and variance, respectively for a regression on continuous parents;

employing probabilistic inference to determine quantities in the parameter gradient expression;

converting a resulting parameterization into a non-exponential representation;

utilizing a propagation scheme on the non-exponential parameterization in order to compute at least one gradient;

assigning, for all families $(X_v, X_{pa(v)})$ where $X_v$ is a continuous variable, each configuration of discrete parent variables $x^d_{pa(v)}$ a sum vector and a sum of squares matrix for expected posterior statistics associated with conditional distributions for the continuous variable and its continuous parents $(X_v, X^c_{pa(v)})$ given configurations of discrete parents;

For each data case in a data set:

utilizing a propagation scheme for Bayesian networks with conditional Gaussian distributions to determine a mean vector and a covariance matrix associated with a posterior marginal distribution for all families $(X_v, X_{pa(v)})$, where $X_v$ is a continuous variable;

employing posterior conditional means and variances to determine expected values $(x_v^*, x^c_{pa(v)}{}^*)$ and $((x_v x_v)^*, (x_v\ x^c_{pa(v)})^*, (x_v\ x^c_{pa(v)}{}')^*, (x^c_{pa(v)}{}'x^c_{pa(v)})^*)$ for continuous variables in each of these families given each configuration of discrete variables in the respective families;

adding the expected values to the sum and the sum of squares expected posterior statistics; and determining the parameter gradients utilizing a formula for a sample of incomplete observations;

employing the CG graphical model to deduce a cause of the given outcome in an artificial intelligence application; and displaying the deduced cause on a display device.

13. The method of claim 12 further comprising:

employing the parameter gradients in a gradient-based optimization process that iteratively adapts parameters of a model to improve incomplete data likelihood.

14. The method of claim 13, the gradient-based optimization process comprising a conjugate gradient process.

15. The method of claim 12 further comprising:

utilizing a Recursive Exponential Mixed Model (REMM) representation of the CG graphical model to facilitate in determining the parameter gradients.

16. The method of claim 12 further comprising:

determining parameter gradients of a graphical model with at least two equal parameters.

17. The method of claim 12 further comprising:

determining parameter gradients of a graphical model with at least one parameter fixed to a specific value.

18. The method of claim 12 further comprising:

determining parameter gradients of a graphical model with at least one parameter fixed to a specific value and with at least two equal parameters.

19. The method of claim 18, the graphical model comprising a stochastic autoregressive moving average model.

20. The method of claim 12 further comprising:

optimizing at least one gradient parameter via utilization of an exponential model representation that automatically enforces that $p^s \geq 0$ and $$\sum_s p^s = 1$$

to facilitate in optimizing at least one gradient parameter;

converting the resulting parameterization into a non-exponential representation; and utilizing a propagation scheme on the non-exponential parameterization in order to compute at least one gradient.

21. The method of claim 12, the incomplete observation data comprising data that is incomplete in a non-informative manner.

22. The method of claim 12, the parameter gradients comprising conditional multinomial local gradients and/or at least one conditional Gaussian local gradients.

23. The method of claim 12, the probabilistic inference comprising a propagation scheme for Bayesian networks with conditional Gaussian distributions.

24. The method of claim 12 further comprising:

assigning, for all families $(X_v, X_{pa(v)})$ where $X_v$ is a continuous variable, each configuration of discrete parent variables $x^d_{pa(v)}$ a local sample gradient vector and selling it to zero;

For each data case in a data set:

utilizing a propagation scheme for Bayesian networks with conditional Gaussian distributions to determine a mean vector and a covariance matrix associated with a posterior marginal distribution for all families $(X_v, X_{pa(v)})$, where $X_v$ is a continuous variable;

employing posterior conditional means and variances to determine expected values $(x_v^*, x^c_{pa(v)}{}^*)$ and $((x_v x_v)^*, (x_v\ x^c_{pa(v)})^*, (x_v\ x^c_{pa(v)}{}')^*, (x^c_{pa(v)}{}'x^c_{pa(v)})^*)$ for continuous variables in each of these families given each configuration of discrete variables in the respective families;

determining sample parameter gradients utilizing a formula for a sample of incomplete observations; and adding single observation gradients to the sample parameter gradients.

25. A system that facilitates statistical modeling in an artificial intelligence application, comprising:

a processor;

a memory communicatively coupled to the processor, the memory having stored therein computer-executable instructions configured to implement the system, including:

means for receiving at least one data set representing a given outcome, the at least one data set containing a set of variables;

means for utilizing the data set for the set of variables and probabilistic inference to determine parameter gradients for a log-likelihood of a conditional Gaussian (CG) graphical model over those variables with at least one continuous variable and with incomplete observation data for at least one of the variables, the CG graphical model employed to deduce a cause of the given outcome in an artificial intelligence application;

means for optimizing at least one gradient parameter via utilization of an exponential model representation that automatically enforces that $p^s \geqq 0$ and $$\sum_s p^s = 1$$

to facilitate in optimizing at least one gradient parameter;

means for converting the resulting parameterization into a non-exponential representation;

means for utilizing a propagation scheme on the non-exponential parameterization in order to compute at least one gradient; and means for displaying the parameter gradients on a display device.

26. A device employing the method of claim 12 comprising at least one of a computer, a server, or a handheld electronic device.

27. A device employing the system of claim 1 comprising at least one of a computer, a server, or a handheld electronic device.

* * * * *